United States Patent
Foley et al.

(10) Patent No.: US 10,248,915 B2
(45) Date of Patent: Apr. 2, 2019

(54) RISK PROFILING FOR ENTERPRISE RISK MANAGEMENT

(75) Inventors: Simon N. Foley, Ballycotton (IE); Harold B. Moss, Danvers, MA (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 1737 days.

(21) Appl. No.: 12/044,296

(22) Filed: Mar. 7, 2008

(65) Prior Publication Data

US 2009/0228316 A1   Sep. 10, 2009

(51) Int. Cl.
*G06Q 10/06* (2012.01)

(52) U.S. Cl.
CPC ......... *G06Q 10/06* (2013.01); *G06Q 10/0635* (2013.01)

(58) Field of Classification Search
CPC .................. G06Q 10/06; G06Q 10/0635
See application file for complete search history.

(56) References Cited

U.S. PATENT DOCUMENTS

| | | | | |
|---|---|---|---|---|
| 7,319,971 | B2* | 1/2008 | Abrahams et al. | 705/7.28 |
| 7,593,859 | B1* | 9/2009 | Owens et al. | 705/7.28 |
| 8,010,398 | B2* | 8/2011 | Abrahams et al. | 705/7.28 |
| 2002/0087341 | A1* | 7/2002 | Kappel et al. | 705/1 |
| 2003/0033191 | A1* | 2/2003 | Davies et al. | 705/10 |
| 2003/0088536 | A1* | 5/2003 | Behnia | 707/1 |
| 2005/0197952 | A1* | 9/2005 | Shea et al. | 705/38 |
| 2006/0129441 | A1* | 6/2006 | Yankovich et al. | 705/8 |
| 2006/0173762 | A1* | 8/2006 | Clater | 705/35 |
| 2007/0136788 | A1* | 6/2007 | Monahan et al. | 726/3 |
| 2007/0192236 | A1* | 8/2007 | Futch et al. | 705/38 |
| 2007/0233508 | A1* | 10/2007 | Gillespie | 705/1 |
| 2008/0103857 | A1* | 5/2008 | Yankovich et al. | 705/7 |
| 2008/0134138 | A1* | 6/2008 | Chamieh et al. | 717/105 |
| 2008/0134152 | A1* | 6/2008 | Edde et al. | 717/135 |
| 2008/0154679 | A1* | 6/2008 | Wade | 705/7 |
| 2008/0221944 | A1* | 9/2008 | Kelly et al. | 705/7 |
| 2008/0288330 | A1* | 11/2008 | Hildebrand et al. | 705/10 |
| 2010/0114634 | A1* | 5/2010 | Christiansen et al. | 705/7 |

OTHER PUBLICATIONS

IBM Corporation. "IBM Tivoli Risk Manager" 2003.*
COSO. "Enterprise Risk Management—Integrated Framework Executive Summary." Sep. 2004.*
John Foulley. "Practices in Enterprise Risk Management." SAS Institute Asia Pacific, 2006.*
The Institute of Internal Auditors. "Bringing ERM into Focus." Jun. 2003.*

(Continued)

*Primary Examiner* — Eric W Stamber
*Assistant Examiner* — George H Walker, III
(74) *Attorney, Agent, or Firm* — Lee Law, PLLC; Christopher B. Lee

(57) ABSTRACT

A risk profile element is created and associated with a control element within a risk hierarchy associated with an organization. A risk attribute is updated automatically within the risk profile element in response to an event associated with the control element. The updated risk attribute is processed to evaluate risk associated with the control element.

23 Claims, 10 Drawing Sheets

(56) References Cited

OTHER PUBLICATIONS

Monson et al IBM Workplace for Business Controls and Reporting, IBM Redpaper 2005.*
COSO Enterprise Risk Management Integrated Framework, Executive Summary, 2005.*
Abrams et al "Optimized enterprise risk management" IBM Systems Journal vol. 46, No. 2, 2007.*
Cameron et al "The role of Real-time information in Risk Management" ISSA 2004.*
Hiller, M.; Jhumka, A.; Suri, N., "An approach for analysing the propagation of data errors in software," Dependable Systems and Networks, 2001. DSN 2001. International Conference on , vol., no., pp. 161,170, Jul. 1-4, 2001 doi: 10.1109/DSN.2001.941402.*
Abstract for: Al-Mudimigh, Abdullah, Mohamed Zairi, and Majed Al-Mashari. "ERP software implementation: an integrative framework." European Journal of Information Systems 10, No. 4 (2001): 216-226.*

Bruce G. Buchanan and Edward H. Shortliffe (editors), Rule-Based Expert Systems: The MYCIN Experiments of the Stanford Heuristic Programming Project, Book, 1985, Chapter 11, pp. 233-262, AAAI Press, Also published by Addison-Wesley, Reading, MA.
S. N. Foley, W. Fitzgerald, S. Bistarelli, B. O'Sullivan, M. O'Foghlu, Principles of Secure Network Configuration: Towards a Formal Basis for Self-Configuration, Proceedings of IPOM 2006, 6th IEEE International Workshop on IP Operations and Management, Symposium, Oct. 2006, pp. 168-180, IEEE Computer Society, Los Alamitos, CA.
K. Menger, Statistical Metrics, Proc. Nat. Acad. Sci. U.S.A., Journal, 1942, pp. 535-537, vol. 28, National Academy of Science, USA.
P. Monson, J. Schablein, C. Vanderwoude, IBM Workplace for Business Controls and Reporting, Administration and Operations Best practices, Journal, Web Article, Oct. 2005, Chapter 2, pp. 11-18, IBM, http://www.redbooks.ibm.com/redpapers/pdfs/redp4021.pdf.

* cited by examiner

RISK PROFILING FOR ENTERPRISE RISK MANAGEMENT

BACKGROUND OF THE INVENTION

Field of the Invention

The present invention relates to systems and methods for analyzing effectiveness of controls within an Enterprise Risk Management (ERM) system. More particularly, the present invention relates to risk profiling for enterprise risk management.

Related Art

Enterprise Risk Management (ERM) systems are used by business organizations to define response strategies for business events. These business events may include either internal or external risks or opportunities. By defining the response strategies in advance of the business events, the enterprise may better respond to the events. ERM systems provide data for business governance and documentary evidence for audit and compliance activities. As such, ERM systems allow organizations to better comply with regulatory requirements.

Conventional ERM systems are typically designed to comply with published standards. Two bodies that publish ERM standards are the Committee of Sponsoring Organizations of the Treadway Commission (COSO) and the Risk and Insurance Management Society (RIMS). For example, the COSO framework defines, among other things, risk assessment, risk response, control activities, and monitoring activities within a systematic hierarchy.

An enterprise may use such an ERM system to respond to risks or opportunities that are related to its business objectives and to derive information about opportunity management. These ERM systems provide a framework within which relationships between business processes may be documented. Risks and opportunities associated with these business relationships and the controls to mitigate those risks or take advantage of the opportunities are also documented.

An ERM control catalog provides data for business governance and also provides documentary evidence for audit and regulatory compliance activities. These ERM control catalogs are typically large and complex. As such, as systems increase in size, conventional ERM systems require increasing time and effort to compile and comprehend the results of current controls in defending against identified business risks or in taking advantage of business opportunities.

BRIEF SUMMARY OF THE INVENTION

In view of the problems described above with respect to conventional security risk metrics within conventional enterprise risk management (ERM) systems, the subject matter described herein provides multi-layered security risk profiling capabilities for enterprise risk management. Risk profiling improves risk and opportunity management capabilities for an enterprise organization. Risk profiles monitor and provide feedback for the effectiveness of control elements implemented to manage policies within an ERM framework. Risk events associated with the control elements are tracked by the risk profiles in real time. Risk events are further quantified and normalized by applying probabilistic and statistical methods to the risk events. The severity of the risk events may be normalized by applying hysteresis to allow dynamic attack and decay rate variations for the severity of the risk events. Information generated by the risk profiles is either accessed directly or propagated up an ERM hierarchy through multiple ERM system layers for evaluation and analysis. The profile information may be aggregated across an ERM system prior to evaluation and analysis to further normalize the profile information.

A method includes creating at least one risk profile element associated with at least one control element within a risk hierarchy associated with an organization, updating a risk attribute automatically within the at least one risk profile element in response to an event associated with the at least one control element, and processing the updated risk attribute to evaluate risk associated with the at least one control element.

A system includes a control element adapted to mitigate a risk within a risk hierarchy associated with an organization, a risk profile element associated with the control element adapted to monitor the effectiveness of the control element at mitigating the risk, a mask element adapted to update a risk attribute automatically within the risk profile element in response to an event associated with the control element, and an evaluation and analysis module adapted to process the updated risk attribute to evaluate risk associated with the control element.

An alternative system includes a database adapted to store information representing a risk hierarchy associated with an organization, wherein the risk hierarchy comprises at least one policy table stored in the database, and an evaluation and analysis module. The evaluation and analysis module is adapted to access a risk attribute within the at least one policy table stored in the database in response to a control event associated with a control element of the risk hierarchy, update the risk attribute in response to the control event, store the updated risk attribute within the at least one policy table stored in the database in response to the control event, normalize a value associated with the updated risk attribute, aggregate the normalized value of the updated risk attribute with at least one other attribute value, propagate a result of the normalized value aggregated with the at least one other attribute value to a level within the policy table higher than a level associated with the updated risk attribute, analyze the result of the normalized value aggregated with the at least one other attribute value, and determine, based upon the analyzed result, whether the value associated with the updated risk attribute has crossed a threshold associated with the risk attribute indicative of risk for the organization.

A computer program product includes a computer useable medium including a computer readable program. The computer readable program when executed on a computer causes the computer to create at least one risk profile element associated with at least one control element within a risk hierarchy associated with an organization, update a risk attribute automatically within the at least one risk profile element in response to an event associated with the at least one control element, and process the updated risk attribute to evaluate risk associated with the at least one control element.

Those skilled in the art will appreciate the scope of the present invention and realize additional aspects thereof after reading the following detailed description of the preferred embodiments in association with the accompanying drawing figures.

BRIEF DESCRIPTION OF THE SEVERAL VIEWS OF THE DRAWINGS

The accompanying drawing figures incorporated in and forming a part of this specification illustrate several aspects of the invention, and together with the description serve to explain the principles of the invention.

DETAILED DESCRIPTION OF THE INVENTION

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In view of the problems described above with respect to conventional security risk metrics within conventional enterprise risk management (ERM) systems, the subject matter described herein provides multi-layered security risk profiling capabilities for enterprise risk management. Risk profiling improves risk and opportunity management capabilities for an enterprise organization. Risk profiles monitor and provide feedback for the effectiveness of control elements implemented to manage policies within an ERM framework. Risk events associated with the control elements are tracked by the risk profiles in real time. Risk events are further quantified and normalized by applying probabilistic and statistical methods to the risk events. The severity of the risk events may be normalized by applying hysteresis to allow dynamic attack and decay rate variations for the severity of the risk events. Information generated by the risk profiles is either accessed directly or propagated up an ERM hierarchy through multiple ERM system layers for evaluation and analysis. The profile information may be aggregated across an ERM system prior to evaluation and analysis to further normalize the profile information. For purposes of the present description real time shall include any time frame of sufficiently short duration as to provide reasonable response time for information processing acceptable to a user of the subject matter described. Though illustrated within the context of risk profiling in association with enterprise risk management, the subject matter described may be used for event profiling within any environment, context, or system.

Figure 1:
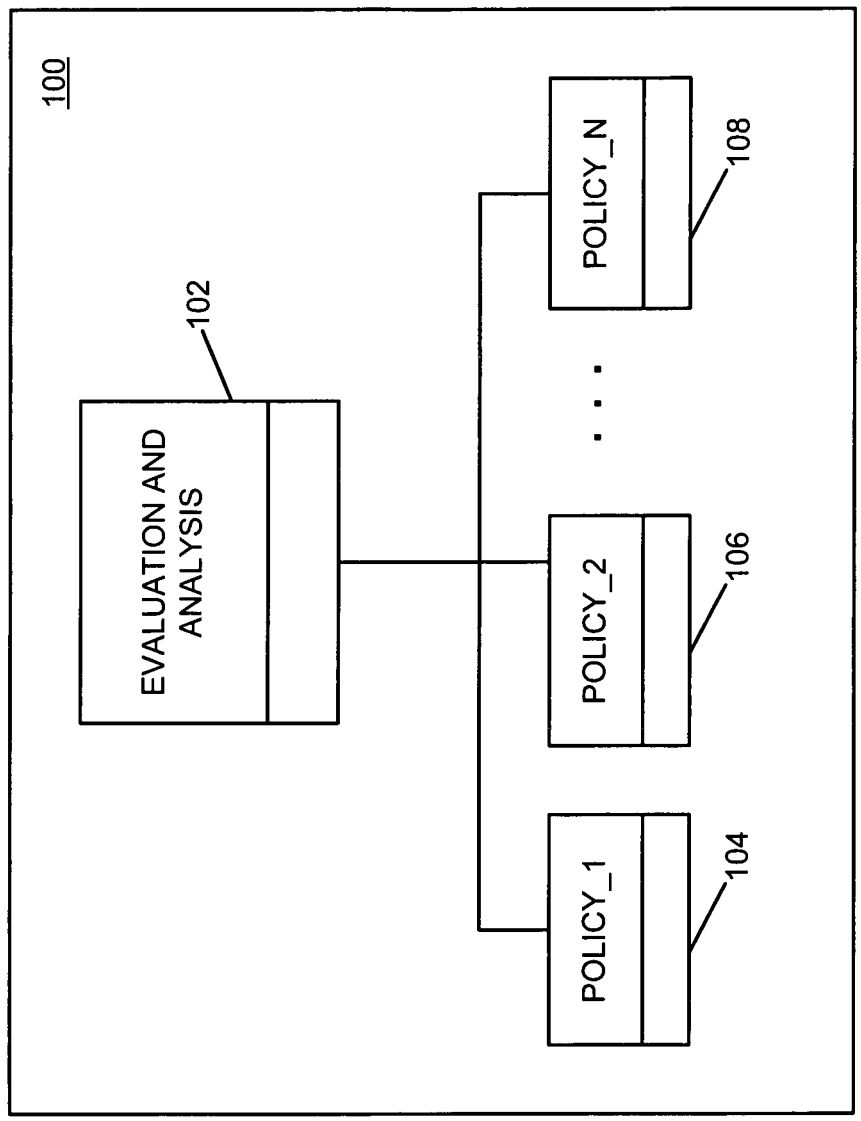
FIG. 1 illustrates an architectural block diagram of an example implementation of an Enterprise Risk Management (ERM) system that may be used to support security risk management, security risk control, and security risk profiling for an organization according to an embodiment of the present subject matter.

FIG. 1 illustrates an architectural block diagram of an example implementation of an Enterprise Risk Management (ERM) system 100 that may be used to support security risk management, security risk control, and security risk profiling for an organization according to an embodiment of the present subject matter. An evaluation and analysis module 102 provides real-time and scheduled or periodic analytical capabilities with respect to the effectiveness of policies that have been established within the ERM system 100. The evaluation and analysis module 102 may include any component capable of providing processed data in an organized manner as a result of evaluation and analysis of that data. For example, the evaluation and analysis module 102 may include a computer, personal or mainframe, and may also include any other computational device capable of presenting information to a user of the evaluation and analysis module 102. The evaluation and analysis module 102 may also include an ensemble of computer systems following steps within an organizational process or activity.

A policy_1 104, a policy_2 106, up to a policy_N 108 are elements or instances of defined organizational objectives to be monitored and controlled within the ERM system 100. For example, the policy_1 104 may define an organizational objective associated with network security, such as preventing an outside entity from accessing an organization's private network. Alternatively, the policy_1 104 may define an organizational objective associated with an employee's reporting requirements or an objective associated with a strategy for managing business opportunities. As such, the policies 104 through 108 within the ERM system 100 may be associated with any measurable issue or event that affects an organization.

It should be noted that modules within the ERM system 100 are illustrated using unified modeling language (UML). While not a necessary component of the subject matter described, UML provides for ease of reference to and interconnection between elements or components within the ERM system 100 and also provides for ease of references to attributes available from and within instances of elements or components within the ERM system 100.

Figure 2:
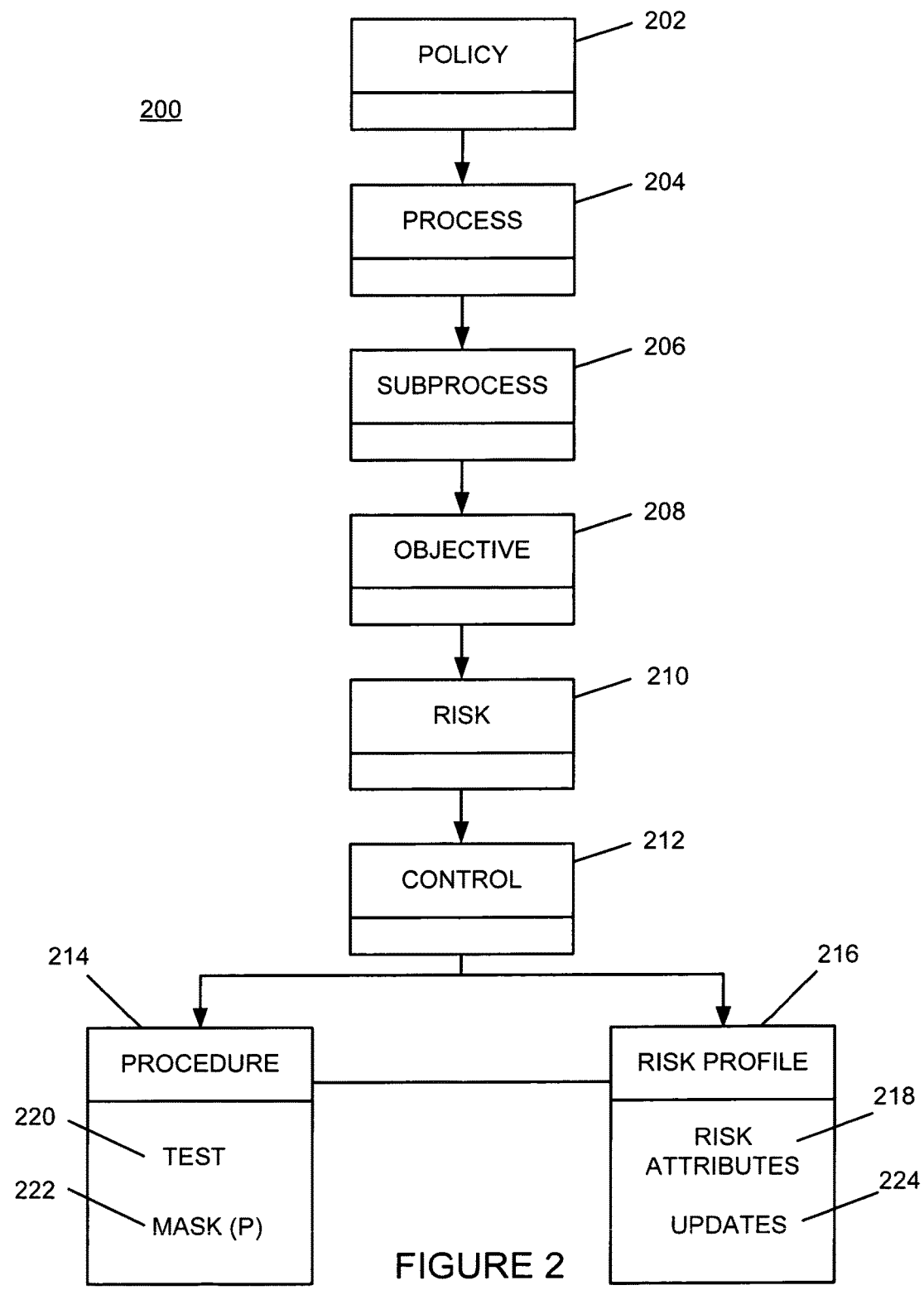
FIG. 2 illustrates an example of an implementation of a policy hierarchy class definition for a policy of an ERM system, where the example policy hierarchy defines a multi-layered class definition to support security risk management, security risk control, and security risk profiling for an organization according to an embodiment of the present subject matter.

FIG. 2 illustrates an example of an implementation of a policy hierarchy 200 class definition for a policy, such as the policy_1 104, of the ERM system 100. The policy hierarchy 200 defines a multi-layered class definition to support security risk management, security risk control, and security risk profiling for an organization. A policy class 202 represents the top entity definition within the policy hierarchy 200. The hierarchical relationship between modules that implement the policy 202 is depicted as a vertical relationship within FIG. 2, though this should not be considered limiting as any other arrangement of organizational entities and relationships may be used. Instances of classes defined within the policy hierarchy 200 will be described below beginning with FIG. 3. Accordingly, these instances are not depicted within FIG. 2 for ease of illustration purposes.

As described above, the policy class 202 defines a business objective to be monitored within the ERM system 100. In order to implement that business objective, the policy class 202 associates with a number of other subordinate classes. The subordinate classes may be considered child classes of the associated parent class defined higher within the policy hierarchy 200. These subordinate classes provide increased granularity as the hierarchy is traversed downward from the policy class 202 within FIG. 2. As such, information and behavior defined within the subordinate classes is increasingly granular as the policy hierarchy 200 is traversed downward from the policy class 202.

The policy class 202 associates with at least one process class 204. The process class 204 defines a relatively high level set of procedures and attributes that may be invoked or queried, respectively, by an instance of the policy class 202 to carry out the activities that have been defined for the policy class 202. Additionally, instances of subordinate classes may also operate upon attributes or invoke behavior within instances of a parent class.

As described above, an increasingly granular set of behavior and attributes are defined at each layer of the policy hierarchy 200 as it is traversed downward from the higher to lower level class definitions. As such, at least one subprocess class 206, at least one objective class 208, at least one risk class 210, and at least one control class 212 are defined as the hierarchy is traversed downward. These classes define increased granularity of information and behavior within the policy class 202.

The control class 212 defines aspects of the policy class 202 related to regulation of the respective business risk at an event level within the ERM system 100. The control class 212 provides mechanisms that address the risks identified by its parent classes within the policy hierarchy 200. These mechanisms defined within the control class 212 are designed to counteract those identified risks.

The control class 212 associates with at least one procedure class 214. The control class 212 also associates with at least one risk profile class 216. The procedure class 214 further refines the responsibilities of the control class 212 and provides a mechanism to test for the effectiveness of instances of the control class 212 in addressing the specified risk. The risk profile class 216 defines information and behavior used to determine the effectiveness of instances of the control class 212, as will be described in more detail below.

It should be noted that the risk profile class 216 may further be associated with the procedure class 214, in which case, the procedure class 214 may be considered a common parent for the risk profile class 216. For example, as will be described in more detail below, an execution outcome of a test within an instance of the procedure class 214 or an event operating upon the instance of the procedure class 214 may affect its associated instance of the risk profile class 216.

The risk profile class 216 provides a mechanism for defining a robust monitoring environment with an enhanced set of metrics. By use of the capabilities of and variations on the risk profile class 216 and other system capabilities described below, information processing, presentation, and comprehension may be improved. Additionally, responsiveness to risk events may also be improved.

Instances of the risk profile class 216 provide an indication of the effectiveness of an instance of the control class 212. This indication may be performed in a real-time fashion or scheduled as part of a periodic or systematic monitoring activity, as will be described in more detail below.

Event tracking and monitoring is also provided by instances of the risk profile class 216. The risk profile class 216 defines behavior capable of providing information associated with tracked event activities. The risk profile class 216 defines how its measures should be calculated based on events tracked within an enterprise organization. These events may correspond to, for example, results from procedure tests or from evaluation and analysis activities, as will be described in more detail below. This information may be propagated up the policy hierarchy 200 to the evaluation and analysis module 102 illustrated in FIG. 1, as described in more detail below. Alternatively, the information may be accessed directly by the evaluation and analysis module 102 from any layer within the policy hierarchy 200.

To facilitate the enhanced metric and event tracking capabilities, the risk profile class 216 defines at least one risk attribute 218. The risk attribute 218 is a measurable characteristic associated with an instance of the associated risk class 210, as regulated by an instance of the control class 212. The risk attribute 218 provides a numeric or other value indicative of the associated characteristic. Risk attributes, such as the risk attributes 218, are declared within the risk profile class 216 and are "typed" according to the purpose for the given risk attribute. Data types associated with the risk attribute 218 will be described in more detail below.

In addition to the informational capabilities of the risk attribute 218, the risk profile class 216 defines behavior that may be used to operate upon values associated with the risk attribute 218. As will be described in more detail below beginning with FIG. 3, mathematical and probabilistic expressions are defined within the risk profile class 216 for normalization and interpretation of event information. Hysteresis may be used to operate upon the risk attribute 218 via the described mathematical and probabilistic expressions.

Events within the system 100 operate to adjust the results of these mathematical and probabilistic expressions. The results change in response to each triggering event. The risk profile class 216 defines behavior capable of providing a real-time or scheduled indication of the results of these expressions via the risk attribute 218. These results are available at a public interface of the risk profile class 216 or via expressions to facilitate a determination of the effectiveness of the associated instance of the control class 212. As such, the risk profile class 216 defines capabilities for real-time or scheduled feedback of policy effectiveness within the ERM system 100.

The risk profile class 216 encapsulates event and risk characteristics associated with the control class 212. The risk profile class 216 also defines risk measures, provided by attributes such as the risk attribute 218, and calculations that may be either analyzed independently or aggregated across multiple instances of the risk profile class 216. These risk measures and calculations may then be rolled or propagated up the policy hierarchy 200. The roll-up may be performed by initiating a "pull" operation from a higher layer within the system 100 or may be triggered from any layer at the direction of the evaluation and analysis module 102. Roll-up will be described in more detail below in association with FIGS. 9 and 10.

A single definition for the risk profile class 216 may be defined for the control class 212 and may encapsulate all of the behavioral and informational capabilities for the control class 212. Alternatively, multiple class definitions may be provided for the risk profile class 216 for a given control class 212, depending upon granularity and nature of the information to be generated by the risk profile class 216. In the latter case, each discrete instance of the risk profile class 216 defines a different set of behavior and information associated with the control class 212. The behavioral and informational capabilities of multiple instances of the risk profile class 216 for a given instance of the control class 212 may overlap without departure from the scope of the subject matter defined herein.

Data types for the risk attributes 218 are defined to include discovered, updated, and calculated data types. The "discovered" data type includes static values that are designated for the risk class 210 when the risk profile class 216 is defined. For example, the values "isKey" and "controlWeight" defined within a control catalog, such as the Committee of Sponsoring Organizations of the Treadway Commission (COSO)/ERM control catalog, may be used as discovered static values for the risk attribute 218. Alternatively, for information technology (IT) system-oriented controls, values for system/security characteristics may be used as discovered static values for the risk attribute 218. Many other discovered attribute types are possible and all are considered within the scope of the subject matter described herein.

The "updated" data type includes values that are updated according to the outcome of related procedure tests within an instance of the associated procedure class 214. Updated attributes are public-interface attributes and are accessible via a public interface of an instance of the risk profile class 216. The updated attributes provide for input to an instance of the risk profile class 216 in response to events within the ERM system 100. The updated attributes may be accessed either by value or by reference, and may also be accessed via public interface methods or procedures defined within the risk profile class 216. As will be described in more detail below, modification of the updated attributes within an instance of the risk profile class 216 in response to events within the ERM system 100 provides real-time evaluation of risk within the ERM system 100.

The "calculated" data type includes values that are defined as a mathematical expression in terms of the values of other attributes defined within the risk profile class 216. These other attributes may be calculated or non-calculated attributes (e.g., discovered or updated attributes). Calculated attributes provide configurable metrics within the ERM system 100. Calculated attributes are also accessible from the public interface of an instance of the risk profile class 216 and provide for output from an instance of the risk profile class 216 for analysis in response to events within the ERM system 100. The calculated attributes may be accessed either by value or by reference, and may also be accessed via public interface methods or procedures defined within the risk profile class 216.

Turning now to the associated procedure class 214. The procedure class 214 defines one or more behavioral components, such as a test 220. The test 220 is an executable method or routine that determines the effectiveness of an instance of the control class 212. The result of an execution of an instance of the test 220 within an instance of the procedure class 214 has an outcome of pass, fail or other.

A "pass" outcome may be used as a positive indication and may be used either to modify the risk attribute 218 or may be used to indicate that the risk attribute 218 is to be left unmodified. For example, the risk attribute 218 may be incremented in response to the pass condition for a metric, such as confidence that a component or a component manufacturer is reliable. Alternatively, the risk attribute 218 may be left unmodified in response to a pass condition for a metric, such as a failure count for a component or manufacturer.

A "fail" outcome typically indicates that the risk attribute 218 is to be modified to reflect the failed outcome of the test 220. The "other" outcome may be used for any reporting or procedural purpose within the ERM system 100.

To allow modification of the risk attribute 218, each test 220 has an associated masked type definition mask(p) type 222, where "p" represents a parameter or parameter set associated with an instance of the test 220. The mask(p) type 222 defines a relationship between itself and an updates attribute 224 defined within the risk profile class 216. Accordingly, the mask(p) type 222 defines an operator within the procedure class 214 that acts upon attributes within an instance of the risk profile class 216, as will be described in more detail below in association with FIG. 3.

The updates attribute 224 defines a relationship that controls whether the outcome of the associated procedure test 220 affects one or more risk attributes 218 of the "updated" type within the risk profile class 216. If an instance of the mask(p) type 222 updates a given risk attribute 218, then the execution result of a procedure of the mask(p) type 222 type will update the value of the respective risk attribute 218 within its associated instance of the risk profile class 216.

Figure 3:
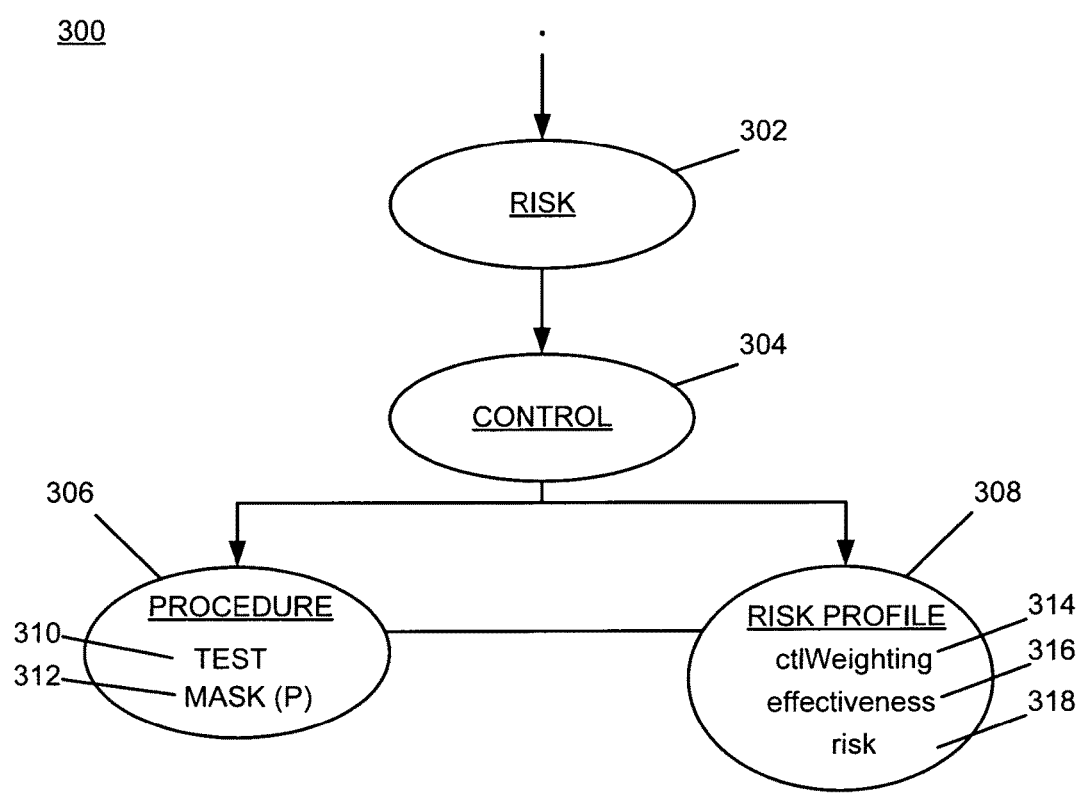
FIG. 3 illustrates an example of an implementation of a portion of a policy instance instantiated from the policy hierarchy of FIG. 2 to support security risk management, security risk control, and security risk profiling for an organization according to an embodiment of the present subject matter.

FIG. 3 illustrates an example of an implementation of a portion of a policy instance 300 instantiated from the policy hierarchy 200 of FIG. 2 to support security risk management, security risk control, and security risk profiling for an organization. Higher layers of the policy instance 300 are not depicted within FIG. 3 for ease of illustration. A risk instance 302 is instantiated from the risk class 210, a control instance 304 is instantiated from the control class 212, a procedure instance 306 is instantiated from the procedure class 214, and a risk profile instance 308 is instantiated from the risk profile class 216. These instances encapsulate behavior, capabilities, and informational resources defined within the respective class definitions. It is understood that instantiation includes the creation of an element or object capable of providing executable behavior and addressable information within the ERM system 100. As such, any approach to creation of a system element or component, such as any hardware, software, or other approach to creation of a system element or component is within the scope of the present subject matter.

As can be seen from FIG. 3, the procedure instance 306 includes a test instance 310 and a mask(p) instance 312. When the test instance 310 executes in response to activities or events associated with the control instance 304, that triggers the mask(p) instance 312 to execute to update attributes, such as the effectiveness attribute 316, within the risk profile instance 308. This mechanism provides a way to update attributes within the risk profile instance 308 in response to execution of tests, such as the test instance 310, within the procedure instance 306.

The risk profile instance 308 includes a control weighting (ctlWeighting) attribute 314, an effectiveness attribute 316, and a risk attribute 318. The ctlWeighting attribute 314 provides a weighting of the control instance 304 as defined within a control catalogue (not shown) associated with the policy instance 300. The effectiveness attribute 316 is a score reflecting measured effectiveness of the control instance 304. The risk attribute 318 reflects the risk associated with the control instance 304. As will be described in more detail below, the risk attribute 318 updates in response to events associated with the control instance 304 to provide granular real-time or scheduled metric capabilities within the ERM system 100.

For purposes of the present example, the ctlWeighting attribute 314 is a discovered attribute, the effectiveness attribute 316 is an updated attribute, and the risk attribute 318 is a calculated attribute. For ease of illustration, the following Equation (1) depicts a relationship between these attributes without reference designators.

$$risk = effectiveness * ctlWeighting \qquad (1)$$

Accordingly, based upon this relationship as depicted within Equation (1), the risk attribute 318 measures a weighted control of the effectiveness of the control instance 304. The effectiveness attribute 316 is additionally a weighted likelihood that the control instance 304 will be effective. As described above, the effectiveness attribute 316 is an updated attribute having a mask relationship, the mask(p) instance 312, defined within the procedure instance 306. As described above, the mask(p) instance 312 operates upon the effectiveness attribute 316 within the risk profile instance 308 in response to execution of the test instance 310. The ctlWeighting attribute 314 defines the weight to be given to the updated effectiveness attribute 316.

The combination of the ctlWeighting attribute 314 with the effectiveness attribute 316 occurs in real time, such that the risk attribute 318 updates in real time as events occur within the ERM system 100. However, this should not be considered limiting, as any scheduled or periodic update of the risk attribute 318 may be used without departure from the scope of the present subject matter described.

While the preceding description references how the associated attributes correlate with instantiated components, it should be understood that information obtained from instantiated class components may also be used to determine whether and how class definitions may be modified to improve the quality of information generated. Accordingly, class design feedback may also be implemented within the ERM system 100 to provide continuous improvement of information generated within the ERM system 100.

In order to engage the outcome of a procedure test and to provide real-time or scheduled information for analysis by the evaluation and analysis module 102, the mask(p) instance 312 interacts with any "updated" attributes in the public interface of the risk profile instance 308 in response to execution of the test instance 310. The results of the masked update operations on the public-interface attributes are used in real time to modify the appropriate calculated attributes within the public interface of the risk profile instance 308. For purposes of the present example, the mask(p) instance 312 defines a pass/fail mask on the effectiveness attribute 316 within the risk profile instance 308.

The following pseudo code segment defines an example of behavior for the mask(p) instance 312.

```
passfail mask(Outcome o, Attribute a){ if
    Outcome o is pass then
        subtract 1 from the current value of Attribute a
    elseif Outcome is fail then
        add 1 to the current value of Attribute a
    elseif outcome is other then
        add the value supplied outcome to Attribute a
}
```

Accordingly, as can be seen from this example pseudo code, the mask(p) instance 312 provides hysteresis to allow the value of the effectiveness attribute 316 to either be incremented or decremented based upon the outcome of the test instance 310. Alternatively, the rate of change of the effectiveness attribute 316 may be different for the pass and fail conditions. For example, the effectiveness attribute 316 may be incremented by two (2) on a fail condition instead of incremented by one (1). This change results in a faster decline rate for the effectiveness attribute 316 relative to the increase rate. By varying the hysteresis in this way, the effectiveness attribute 316 may be tailored to the criticality of the aspects controlled by the control instance 304. It should be noted that many other hysteresis rate differentials and behaviors for the mask(p) instance 312 are possible and all are considered within the scope of the present subject matter.

In addition to utilizing the mask relationship to modify updated attributes, there are additional possibilities for the mask relationship. For example, the mask relationship may be used to modify attributes in real time to set or reset the attributes to a predefined or discovered value. The following pseudo code segment defines an example of behavior for utilizing the mask(p) instance 312 to reset the value of an attribute.

```
reset mask (Outcome o, Attribute a){
    if Outcome o is pass then
        set the Attribute a to some discovered value
    elseif Outcome o is fail then
        Attribute a value remains unchanged
}
```

It should be noted that the previous pseudo code segments depict a relationship whereby a reference to the attribute is processed directly by the pseudo code. However, there are many other possible approaches to referencing and updating an attribute and all are considered within the scope of the present subject matter. For example, rather than pass by reference, the attribute may be passed by value and returned. Alternatively, messaging may be implemented with a public interface procedure or method defined within the risk profile instance 308 for updating any updated attributes.

Severity of an Updated Attribute

Attributes may be interpreted in terms of "severity." Severity of an attribute represents an indicator of the risk significance associated with the attribute. Severity provides a way to normalize risk attributes that have different interpretations. A risk attribute a can have a severity generator function, such as $g_a(v)$. The severity generator function maps a numeric value "v" of attribute "a" into a numeric range, such as zero to one (e.g., [0 . . . 1]). Accordingly, severity may be considered a probabilistic measure of the severity of an attribute. A severity generator function may be defined for any attribute, such as any updated or discovered attribute, within the ERM system 100.

While a severity generator may be defined by any function, a generalized logistic function as described below provides one example of an implementation of a severity generator function. For each attribute for which a severity generator function is to be defined, a low and a high threshold are specified. Attribute values below the low threshold are considered to have insignificant severity, while attribute values above the high threshold are considered to have significant severity.

A severity generator function, $g_a(v)$, is implemented as severity(lo, hi, v). Equation (2) depicts a general logistic function.

$$\text{logistic}(X)=1/(1+\exp(X)) \quad (2)$$

Within Equation (2), the function exp(X) represents exponentiation to the base "e." Equation (2) may be programmed for computational processing using a polynomial representation, as depicted within Equation (3).

$$\exp(X)=\text{alpha}+\text{beta}*X \quad (3)$$

Within Equation (3), alpha and beta may be calculated from the designated low and high severity thresholds of the respective attribute and "X" is variable. Equations (4) and (5) provide formulations for calculating and programming alpha and beta within Equation (3).

$$\text{alpha}(lo,hi,r)=((lo+hi)/(1-hi))*\log((1-r)/r) \quad (4)$$

$$\text{beta}(lo,hi,r)=-2*\text{alpha}(lo,hi,r)/(lo+hi) \quad (5)$$

Within Equation (4), the expression "log(x)" is the natural logarithm (e.g., to the base e) of the variable "x." Within Equations (4) and (5), the value "r" defines a residual severity value for the variable "lo," and "1−r" defines a residual severity value for the variable "hi." Based upon these definitions, the severity generator function with a residual of 0.01 is defined as represented within Equation (6).

$$\text{severity}(lo,hi,X)=\text{logistic}(\text{alpha}(lo,hi,0.01)+\text{beta}(lo,hi,\\ 0.01)*X) \quad (6)$$

Accordingly, based upon FIG. (2) through (6), the severity of an updated attributed defines a mathematical or probabilistic measure and indicator of the risk significance associated with the respective updated attribute. As will be described below beginning with FIGS. 4 and 5, the rate at which an updated attribute reaches its defined high threshold may be controlled and hysteresis may be employed to provide varying attack and decay rates for the probabilistic functions that define the severity for the attribute.

Figure 4:
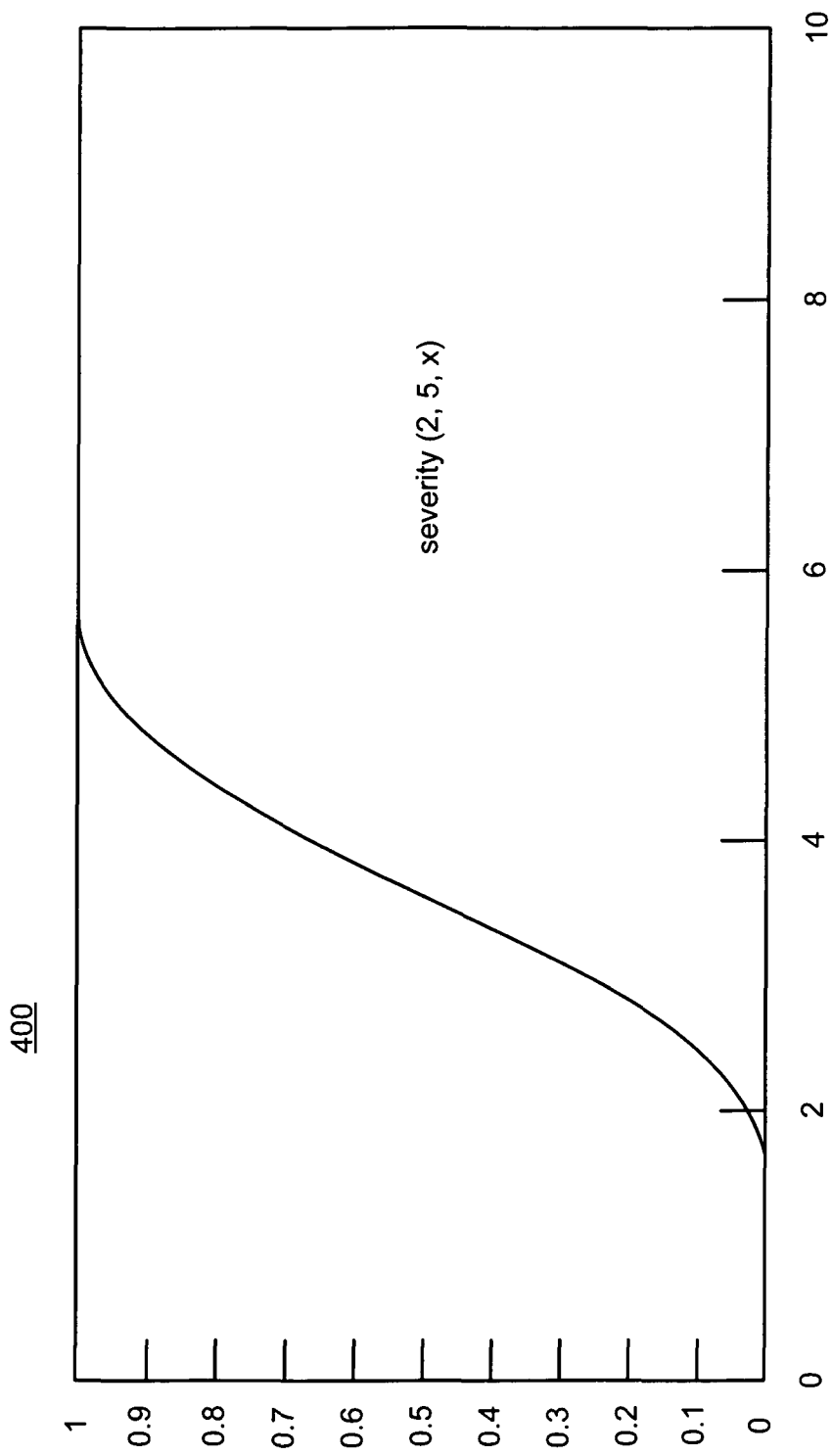
FIG. 4 illustrates an example of an implementation of a severity generator function with a rapid severity rate that may be used to characterize the criticality of risk events associated with a policy instance according to an embodiment of the present subject matter.

FIG. 4 illustrates an example of an implementation of a severity generator function 400 with a rapid severity rate that may be used to characterize the criticality of risk events associated with a policy instance, such as the policy instance 300 of FIG. 3. The severity generator function 400 has a low threshold of two (2) and a high threshold of five (5) by which values of an associated risk attribute, such as the risk attribute 318, are evaluated and analyzed. Based upon the definition of the severity generator function 400, values for the risk attribute 318 below two (2) are not severe and values above five (5) are considered severe.

As can be seen from FIG. 4, the risk attribute 318 will approach severity via a relatively steep slope with only a few failures for a procedure test, such as the test instance 310, allowable prior to considering the associated control instance 304 to be in a severe condition. Accordingly, the severity generator function 400 may be used for relatively critical events within a system.

Figure 5:
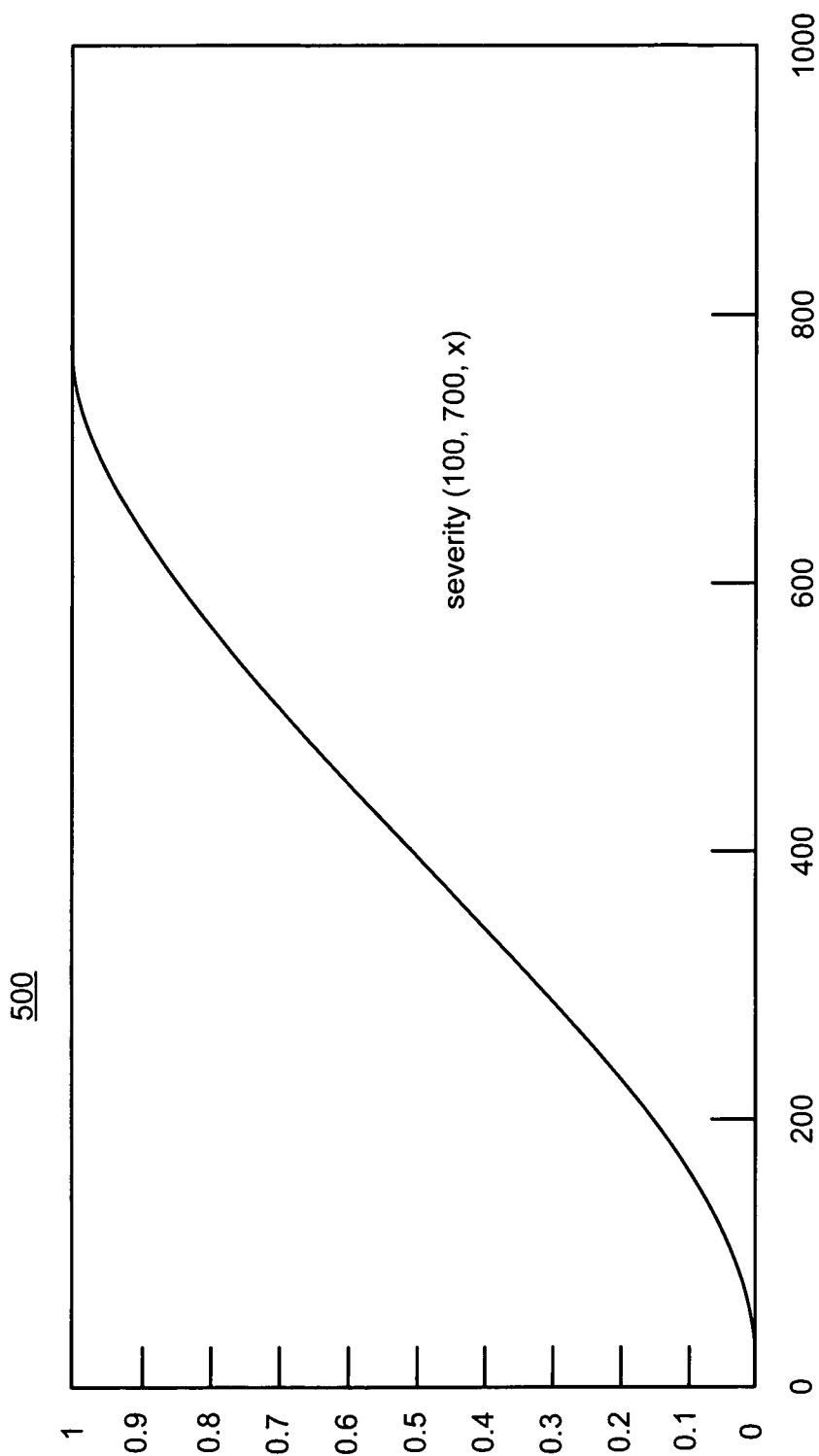
FIG. 5 illustrates an example of an implementation of a severity generator function with a gradual severity rate that may be used to characterize the criticality of risk events associated with a policy instance according to an embodiment of the present subject matter.

FIG. 5 illustrates an example of an implementation of a severity generator function 500 with a gradual severity rate that may be used to characterize the criticality of risk events associated with a policy instance, such as the policy instance 300 of FIG. 3. The severity generator function 500 has a low threshold of one hundred (100) and a high threshold of seven hundred (700) by which values of an associated risk attribute, such as the risk attribute 318, are managed and evaluated. Based upon the definition of the severity generator function 500, values for the risk attribute 318 below one hundred (100) are not severe and values above seven hundred (700) are considered severe.

As can be seen from FIG. 5, the risk attribute 318 will approach severity via a relatively gradual slope when compared to the severity generator function 400 of FIG. 4. If each event increments or decrements the severity generator function 500 by one count, many events are allowable prior to considering the associated control instance 304 to be in a severe condition. Accordingly, the severity generator function 500 may be used for relatively non-critical events within a system.

Many other severity generator functions are possible and all are considered within the scope of the subject matter described herein. Further, the rate at which a given severity generator function increments or decrements based upon events within the system may be changed without departure from the scope of the subject matter described. For example, the rate at which a given severity generator function approaches severity may be faster than the rate at which the given severity generator function decays from severity. Alternatively, the rates may be inverted such that the decay rate is faster than the attack rate. As such, hysteresis may be provided within the ERM system 100 by varying the attack and decay rates of severity generator functions associated with the risk attribute 318.

In addition to utilizing severity generator functions, such as the severity generator function 400 and the severity generator function 500, within expressions that define calculated risk attributes, such as the risk attribute 318, the severity generator functions have a number of additional possible implementations. One example of an implementation of a severity generator function may be to control the weighting on an attribute within the ERM system 100 other than an attribute within the risk profile instance 308. In such as case, a system attribute such as a control rating attribute (e.g., controlRatinq) may define values of none(0), low(1), medium(2), and high(3). Defining a severity generator function for this system attribute facilitates control over the meaning of these values within the ERM system 100.

Additionally, severity generator functions may be used to provide an interpretation for subjective probability attributes within the ERM system 100. In such a case, if the value of a risk attribute is interpreted to reflect a weighted likelihood of some event, then a severity generator function may be used to interpolate a probability value for the event. When used in this manner, a low threshold indicates a low probability of an event occurring and a high threshold indicates a high probability of an event occurring. Accordingly, severity generator functions may be used to normalize updated attributes that are affected by procedure test outcomes, such as the effectiveness attribute 316 affected by the test instance 310, respectively.

For purposes of illustration, it will be assumed that the effectiveness attribute 316 has an associated severity generator function, such as that depicted within FIG. 4, having a low threshold of two (2) and a high threshold of five (5). With the severity generator function for the effectiveness attribute 316 declared in this manner, it should be apparent based upon the description above, that the effectiveness attribute will tolerate a small number of failures before it is considered severe. Accordingly, treating effectiveness as reflecting a likelihood of the control instance 304 not mitigating its parent risk 302, as represented by the risk attribute 318 in this case, then that risk is computed as defined above in Equation (1).

Evaluating "Calculated" Risk Attributes

As described above, the risk attribute 318 is a calculated attribute that defines an arithmetic expression in terms of other attributes within the risk profile instance 308. Equation (1) depicts an example of such a relationship for the risk attribute 318. Additionally, an expression that defines a calculated attribute within the ERM system 100 may include a combination of attributes with and without associated severity generators. Accordingly, a resulting value of the risk attribute 318 is based upon the values of the other attributes within the same risk profile instance 308. More specifically, the resulting value of the risk attribute 318 is based upon the expression that refers to those other attribute values.

For example, if a referenced attribute, such as the effectiveness attribute 316, has an associated severity generator, then the calculation of the respective calculated attribute uses the normalized severity value for the effectiveness attribute 316. Otherwise, the calculation uses the raw value of the effectiveness attribute 316. In this way, normalized severity generator functions may be incorporated into the ERM system 100 based upon the scope and detail of information designated for the particular attribute. Furthermore, severity generator functions may be incorporated into the ERM system 100 over time to provide dynamic information processing capabilities within the ERM system 100.

As described above, a calculated risk attribute, such as the risk attribute 318, is updated whenever a procedure test, such as the test instance 310 within the procedure instance 306, engages each associated risk profile instance 308. The following pseudo code defines an example of behavior for updating all of the risk profile instances 308 associated with the test instance 310 in response to an event.

```
EvaluateProfile (Procedure p, outcome o) {
    For each RiskProfile instance rp associated with this procedure
        instance p
    {
        For each updated attribute a in RiskProfile if updates (a, p) {
            apply procedure outcome o of p to attribute rp.a
        }
        For each calculated attribute a in RiskProfile {
            set rp.a to evaluation of expr based on (severity) values
                of attributes in rp
        }
    }
}
```

Accordingly, based upon this example pseudo code, when the test instance 310 executes, updated attributes and calculated attributes for each associated risk profile instance 308 are evaluated and modified in real time to provide real-time determinations of effectiveness of the associated control instance 304 within the ERM system 100.

Supporting Different Profile Types

It should be noted that for large and complex enterprise environments, there may be a very large number of risk attributes 318. Within such an environment, subclasses and extensions of the risk profile class 216 may be created to organize and group common informational elements and attributes. This may be implemented as a variant/union structure over the risk profile class 216 or by any other convenient approach to organizing and grouping the subclasses and extensions.

Figure 6:
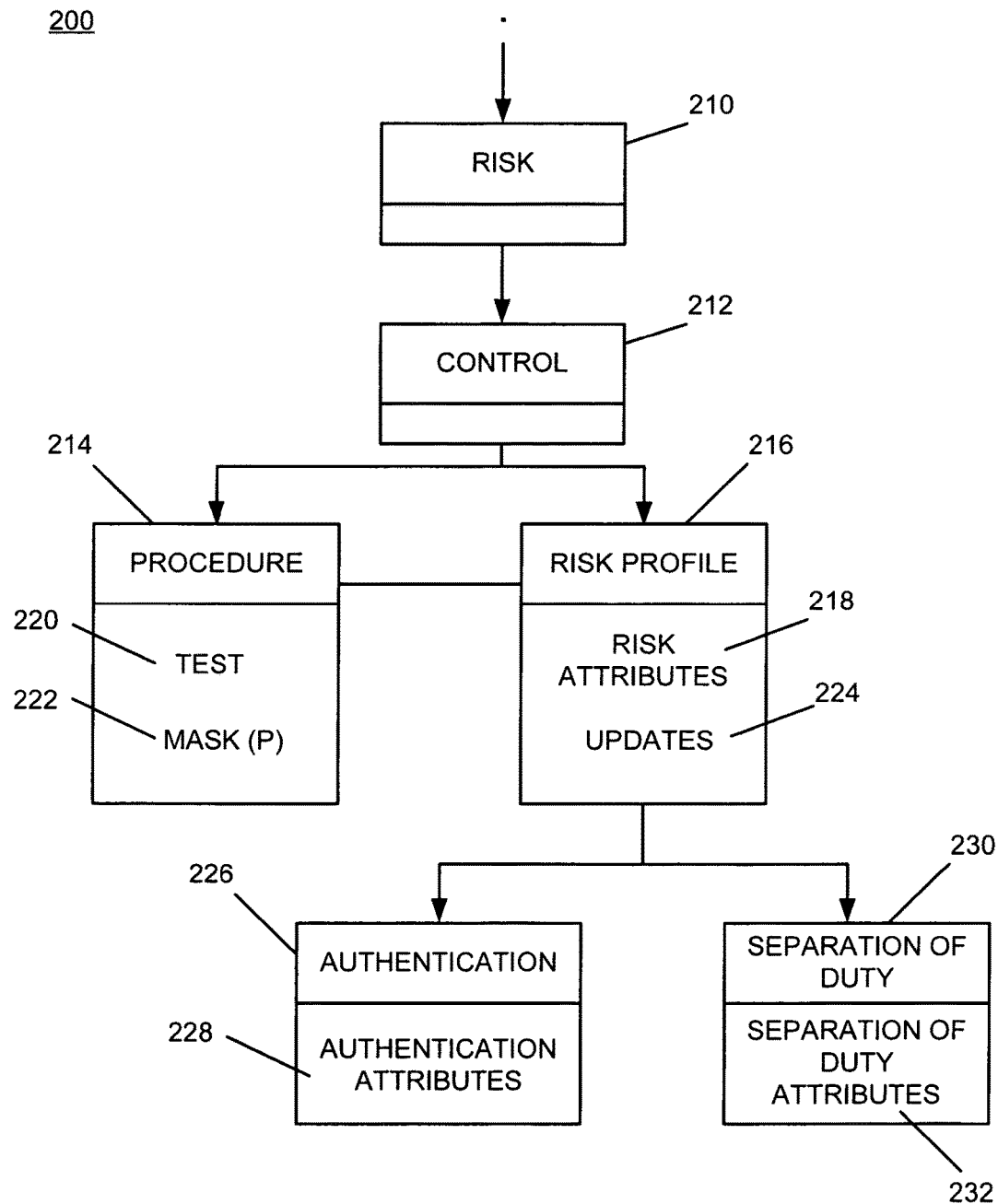
FIG. 6 illustrates example of an implementation of subclass extensions to a portion of the policy hierarchy class definition of FIG. 2 for extending risk profile capabilities to include risk metrics, such as authentication risk and compliance risk according to an embodiment of the present subject matter.

FIG. 6 illustrates an example of an implementation of subclass extensions to a portion of the policy hierarchy 200 class definition of FIG. 2 for extending risk profile capabilities to include risk metrics, such as authentication risk and compliance risk. It is understood that many other extensions to risk profile capabilities are possible and all are considered within the scope of the present subject matter. The extensions to the portion of the policy hierarchy 200 may be used to organize and group common informational elements, attributes, and responsibilities within the ERM system 100. Higher layers of the policy hierarchy 200 are not depicted within FIG. 6 for ease of illustration.

An authentication class 226 defines information and behavior used to authenticate risk profile activities within the ERM system 100. The authentication class 226 defines at least one authentication attribute 228. The authentication attribute 228 is a measurable characteristic associated with an instance of the associated authentication class 226. The authentication attribute 228 provides a numeric or other value indicative of the associated characteristic. Authentication attributes, such as the authentication attribute 228, are declared within the authentication class 226 and are "typed" according to the purpose for the given authentication attribute 228. Data types associated with the authentication attribute 228 will be described in more detail below.

A separation of duty class 230 defines information and behavior used to separate or partition responsibilities associated with risk profile activities within the ERM system 100. The separation of duty class 230 defines at least one separation of duty attribute 232. The separation of duty attribute 232 is a measurable characteristic associated with an instance of the associated separation of duty class 230. The separation of duty attribute 232 provides a numeric or other value indicative of the associated characteristic. Separation of duty attributes, such as the separation of duty attribute 232, are declared within the separation of duty class 230 and are "typed" according to the purpose for the given separation of duty attribute 232. Data types associated with the separation of duty attribute 232 will be described in more detail below.

Figure 7:
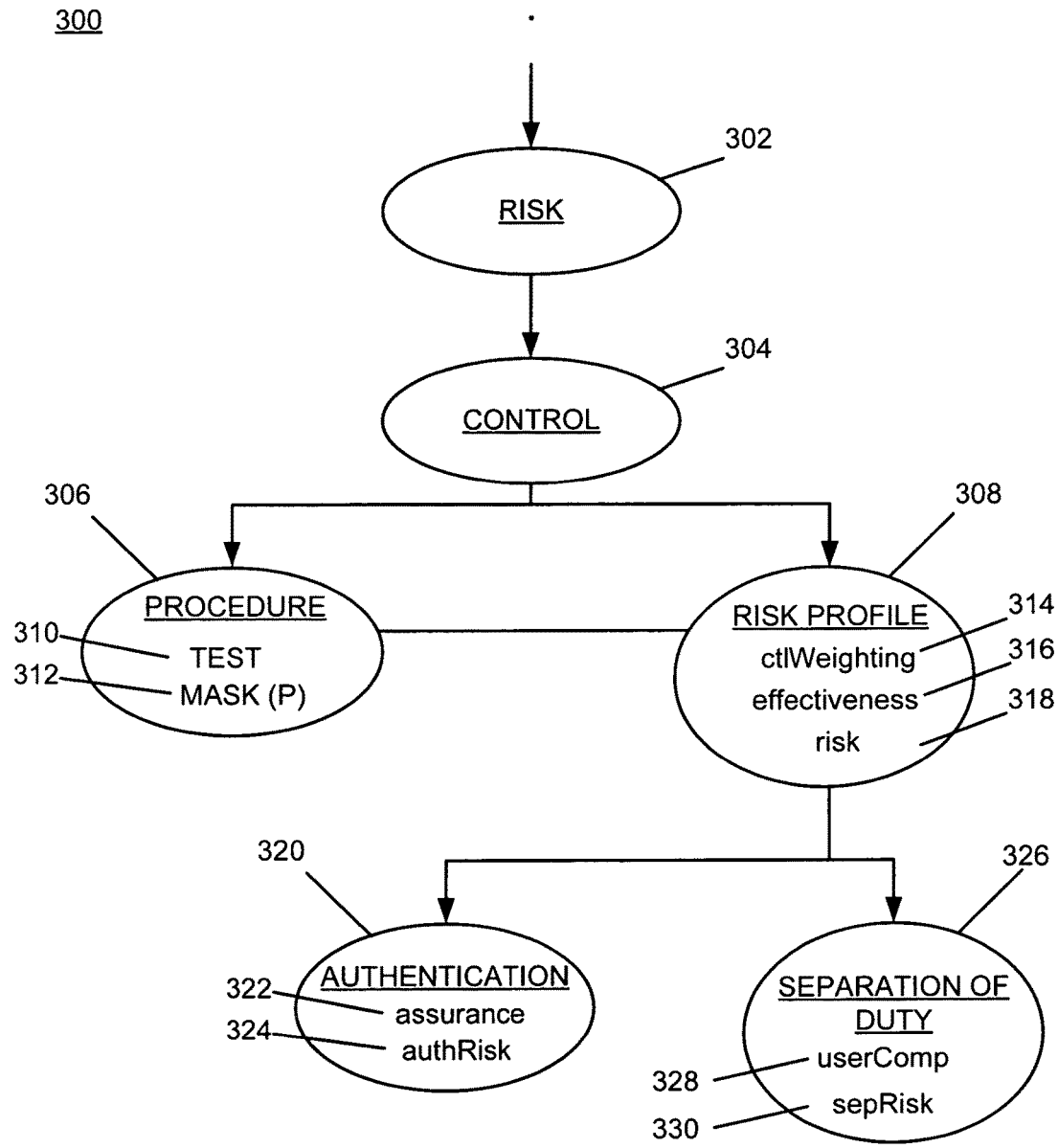
FIG. 7 illustrates an example of an implementation of a portion of the policy instance of FIG. 3 instantiated from the policy hierarchy subclass extensions of FIG. 6 for extending risk profile capabilities to include the risk metrics of authentication risk and compliance risk according to an embodiment of the present subject matter.

FIG. 7 illustrates an example of an implementation of a portion of the policy instance 300 of FIG. 3 instantiated from the policy hierarchy 200 subclass extensions of FIG. 6 for extending risk profile capabilities to include the risk metrics of authentication risk and compliance risk. The extensions to the portion of the policy instance 300 may be used to organize and group common informational elements, attributes, and responsibilities within the ERM system 100. Higher layers of the policy instance 300 are not depicted within FIG. 7 for ease of illustration.

An authentication instance 320 encapsulates capabilities defined within an associated authentication class definition, such as the authentication class 226. The authentication instance 320 instantiates an assurance attribute 322 and an authentication risk (authRisk) attribute 324. Within the present example, the assurance attribute 322 is a discovered attribute. The assurance attribute 322 is a measure of the "assurance" or confidence that the relevant systems that host the authentication services will mitigate the monitored risk. As such, the assurance represented by the assurance attribute 322 may be considered as a measure of the confidence that the associated control instance 304 will mitigate the respective risk.

It should be noted that, while the assurance attribute 322 is represented as a discovered attribute within the present example, the assurance attribute 322 and any other attribute that has been represented as a discovered attribute may alternatively be an updated attribute. As a discovered attribute, the assurance attribute 322 corresponds to a notion of assurance based upon an indication of the ability to mitigate risk. However, the assurance attribute 322 may alternatively be a measure based on a subjective indicator. For example, the assurance attribute 322 may be based on an indication that software from one source has a greater assurance level than software from another source, or that a software component was developed in-house and subjected to a rigorous testing regime compared to relatively lesser-known testing regimes for outsourced software components.

When represented as a discovered attribute, the assurance attribute 322 is ascertained as part of a risk analysis of the elements of interest. The discovery process for the assurance attribute 322 defines a value for the assurance attribute 322. The discovery process may include any approach for designating preliminary or static values for an attribute.

Use of the assurance attribute 322 as an updated attribute corresponds to a situation where events that occur within the ERM system 100 influence the current value of the assurance attribute 322. Accordingly, the value of the assurance attribute 322 may need to be updated in response to these events. In this context, a preliminary value is assigned to the assurance attribute 322 of an associated element, such as a software component, via a discovery process. Test-procedures, such as the test instance 310, may alternatively be used to set initial values and may also be used to adjust the value of the assurance attribute 322 to reflect changing information about the assurance of the respective element. Accordingly, with this extension to the discovered type, values for discovered attributes may be returned as part of an execution of a test procedure that returns an initial or subsequent value for the discovered attribute.

For example, a software component may initially have a relatively high assurance. If a bug is identified via a bug/vulnerability feed from a support group or support system, the arrival of a bug report corresponds to the execution of a test-procedure failure, such as the test instance 310 with a fail result. Execution of the test-procedure failure downgrades the assurance of the element to a lower level from the initial assurance value. When the software version is updated to fix the bug, execution of a test-procedure with a success result may be used to cause the assurance of the element to upgrade back to a higher level. This upgraded level of assurance for the component may additional take into consideration the initial bug/vulnerability condition and, as such, may represent memory within the ERM system 100 of past events. As described above, this memory may take the form of hysteresis with either unified or varying attack and decay rates. Alternatively, the upgraded level of assurance for the component may be placed back to a high level based upon confidence that the source of the software component has reliably fixed the problem.

A severity generator may be used to normalize the value of the assurance attribute 322. When normalized in this way, the associated severity generator function reflects the likelihood that some monitored aspect, such as the security of the ERM system 100, may be bypassed in some way. As such, a high degree of assurance suggests a low probability of compromise for the monitored aspect. Accordingly, assurance has an inverse relationship relative to the monitored risk.

For example, a severity generator defined for the assurance attribute 322 may be defined to correspond to common criteria assurance levels (AL) one through seven (e.g., [AL1 . . . AL7]). Further, the severity generator may be defined to have a low threshold equal to seven (7) and a high threshold equal to one (1). When defined in this way, the severity generator provides a relatively linear relationship between a likelihood that a monitored aspect will not be compromised and a likelihood of compromise for the monitored aspect. In such a context, an assurance level of 1 represents a high likelihood of compromise and an assurance level of 7 represents a low likelihood of compromise. It should be noted that the relationship depicted for assurance is inverted relative to the previous descriptions of the severity generator functions 400 and 500 of FIG. 4 and FIG. 5, respectively. Accordingly, a severity generator function may be defined for any relationship having associated thresholds and all are considered within the scope of the present subject matter.

A calculated attribute is defined in terms of an arithmetic expression involving constant values and other attribute values within a profile instance, such as the risk profile instance 308. The expression may be defined using existing metric space aggregation operators when it is defined exclusively in terms of attributes with values in the domain of zero to one (e.g., [0 . . . 1]). Values that have probability or severity interpretations are examples of attributes with values in the domain [0 . . . 1].

Calculated attribute expressions may be defined in terms of a variety of well-known t-norm () and t-conorm (++) metric space aggregation operators. An example of a t-norm metric space aggregation operator is the probabilistic product (ab=a*b) with t-conorm probabilistic sum (a++b=a+b−a*b). Another common example is a t-norm fuzzy conjunction (a**b=min(a,b)) with t-conorm fuzzy disjunction (a++b=max(a,b)).

The authentication risk attribute 324 is a calculated attribute. The authentication risk attribute 324 provides a weighted and calculated measure of the combined effectiveness of the associated control instance 304 and the assurance that the control instance 304 will mitigate the respective risk. Equation (7) depicts an example representation of the calculated authentication risk attribute 324.

$$\text{authRisk} = (\text{effectiveness} ++ \text{assurance}) ** \text{ctlWeighting} \quad (7)$$

For purposes of the present example, it is assumed that the effectiveness attribute 316 and the assurance attribute 322 are statistically independent. In Equation (7) each attribute has an associated severity generator, with values in the range [0 . . . 1] and operators ++ and ** that are interpreted as probabilistic sum and product, respectively. One skilled in the art will readily be able to identify and utilize the t-conorm probabilistic union and the t-norm probabilistic intersection and such will not be described in detail herein.

The t-norm and t-conorm metric space aggregation operators may be interpreted as conjunction (AND) and disjunction (OR), respectively. For example, Equation (7) may be interpreted to mean that the authentication risk attribute 324 is defined as the risk weighting of the control instance 304 AND the effectiveness of the control instance 304 OR the assurance of the underlying mechanism implemented by the control instance 304.

In addition to t-norm and t-conorm metric space aggregation operators, calculated attribute expressions may also be defined in terms of compensating or uni-norm metric space aggregation operators when the values involved are in the range of zero to one (e.g., [0 . . . 1]). An example of an existing uni-norm is the MYCIN function. These operators are intended to closely match how humans aggregate, that is, there is a potential for non-linearity in the way that humans perceive combinations. For example, a human may place proportionally greater significance on the aggregation of low-severity items than on moderate severity items. Accordingly, a MYCIN uni-norm function may be used to model human aggregation operations.

Based upon the definition within Equation (7), the authentication risk attribute 324 represents a probabilistic union with probability of failure based upon the union of an outcome of the test instance 310 and the assurance attribute 322. Accordingly, for purposes of the present example, Equation (7) for the authentication risk attribute 324 illustrates that risk is based not just on the presence or otherwise of an authentication scheme, but also on a confidence in the authentication scheme operating properly.

A separation of duty instance 326 encapsulates capabilities defined within an associated authentication class definition, such as the separation of duty class 230. The separation of duty instance 326 instantiates a user compliance (usercomp) attribute 328 and a separation risk (sepRisk) attribute 330. The user compliance attribute 328 is an updated attribute that reflects a measure of current user compliance with corporate access control polices, or policy variation associated with risk management. The user compliance attribute 328 updates based upon results from audits of user access controls.

A severity generator function may be used to normalize a resulting value for the user compliance attribute 328. For example, a low threshold may be defined as one (1) compliance violation and a high threshold may be defined as three (3) compliance violations. In such a case, the user compliance attribute 328 indicates a risk-tolerance up to one audit failure, after which the risk measure represented within the user compliance attribute 328 rises sharply, such that the high threshold is passed within three compliance violations indicating a high level of non-compliance.

The separation risk attribute 330 is a calculated attribute and provides a weighted and calculated measure of the combined effectiveness of the associated control instance 304 and the compliance associated with the control instance 304. Equation (8) depicts an example representation of the calculated separation risk attribute 330.

$$sepRisk=(effectiveness++usercomp)**ctlWeighting \qquad (8)$$

As described above in association with Equation (7), it is assumed that the effectiveness attribute 316 and the user compliance attribute 328 are statistically independent. The plus (e.g., "++") operator corresponds to the t-conorm probabilistic union and the multiplication (e.g., "**") operator corresponds to the t-norm probabilistic intersection. One skilled in the art will readily be able to identify and utilize the t-conorm probabilistic union and the t-norm probabilistic intersection and such will not be described in detail herein.

Based upon the definition within Equation (8), the separation risk attribute 330 represents a probabilistic union with probability of failure based upon the union of an outcome of the test instance 310 and the user compliance attribute 328. Accordingly, for purposes of the present example, Equation (8) for the separation risk attribute 330 represents that risk is based not just on the presence or otherwise of an compliance scheme, but also on a confidence in the compliance scheme operating properly.

Aggregation and Roll-Up of Risk Attributes

Risk attributes, such as the risk attribute 318, may be declared as either public or private. When declared as private attributes, the respective attributes are not accessible outside of the respective risk profile instance, such as the risk profile instance 308 for the risk attribute 318. In contrast, when declared as public attributes, the respective attributes are accessible at the public interface of the respective profile instance. The public interface attributes are used to compile information for evaluation and analysis by the evaluation and analysis module 102. The compilation of information may be performed in a variety of ways, such as by aggregation and roll-up.

Aggregation defines how the values of a given attribute type are combined together into manageable sets of information. To effect aggregation, each public attribute in a given profile declares an aggregation operator. The aggregation operator provides detailed arithmetic operations for use during aggregation. Aggregation operators are associative binary operators with a neutral/identity value. For attributes that have severity generators that place their effective values within the range of zero to one (e.g., [0 . . . 1]), as described above, then existing t-norm, t-conorm, and uninorm operators may be used to offer a wide range of aggregation options.

As also described above, a risk profile instance, such as the risk profile instance 308, provides risk measurements regarding the effectiveness of a control instance, such as the control instance 304. The control instance 304 may have a number of associated risk profile instances, each targeted toward a specific effectiveness characteristic of the control instance 304. The public attributes of the various risk profile instances are aggregated to provide an overall risk profile of the public attributes used to evaluate the effectiveness of the control instance 304.

A roll-up operation further aggregates values of the various risk profile instances across control instances within the ERM system 100. The roll-up operation provides a profile of public attribute values for the respective risk class instances, such as instances of the risk class 210, with which the respective control instances are associated. This roll-up calculation continues up the policy hierarchy for the respective policy instance, such as the policy hierarchy 200 defined for the policy instance 300, to aggregate high-level public attribute values for the respective policy instances.

An example of a roll-up operation for policy instances, such as the policy instance 300, within the ERM system 100, may be defined for an attribute "a," of a risk element "e" and calculated as "Rollup(e, a)," as illustrated within the following example pseudo code.

```
Rollup(RiskElement e; RiskAttribute a) {
    if (e is a RiskProfile){
        return value of a in e;
    } else {
        set result to identity;
        for each RiskElement child of e {
            set result to aggregate(result, rollup(child, a));
        }
        return result;
    }
}
```

Within the previous example pseudo code, "identity" represents a neutral element value for the respective attribute under a declared aggregation operation for the attribute.

Equation (9) depicts an example representation of an aggregation operation to provide the identity value within the roll-up pseudo code.

$$\text{aggregate}(x,y) = \text{inverse}G(G(x)+G(y)); \quad (9)$$

The mechanism of Equation (9) supports aggregation operators that are Archimedian. A metric-space operator is Archimedian if it may be defined in terms of arithmetic addition. An operator "&&" is Archimedian if there exists a generator function "G( )" such that x&&y=inverse(G(x)+G(y)). The probabilistic t-norm/t-conorms and the MYCIN uni-norm are examples of Archimedian operators.

The Archimedian property facilitates roll-up in a relational or other database implementation for the ERM system 100. With a risk hierarchy implemented as a collection of relating tables, each table corresponds to the instances of a risk class, such as the risk profile instance 308 that corresponds to the risk profile class 216. Attributes within the tables correspond to respective risk attributes for the risk instance 302. Based upon this implementation example, roll-up may be performed as a complex join across these tables. Parent-child relationships may further be preserved.

Using the Archimedian property, if "G( )" is the generator for the aggregation operator of an attribute "a," then the roll-up calculation is as defined within the following Equation (10) for the column a across the join of the tables.

$$\text{inverse}G(\text{sum}(G(a))); \quad (10)$$

Alternative Implementations and Processes

Figure 8:
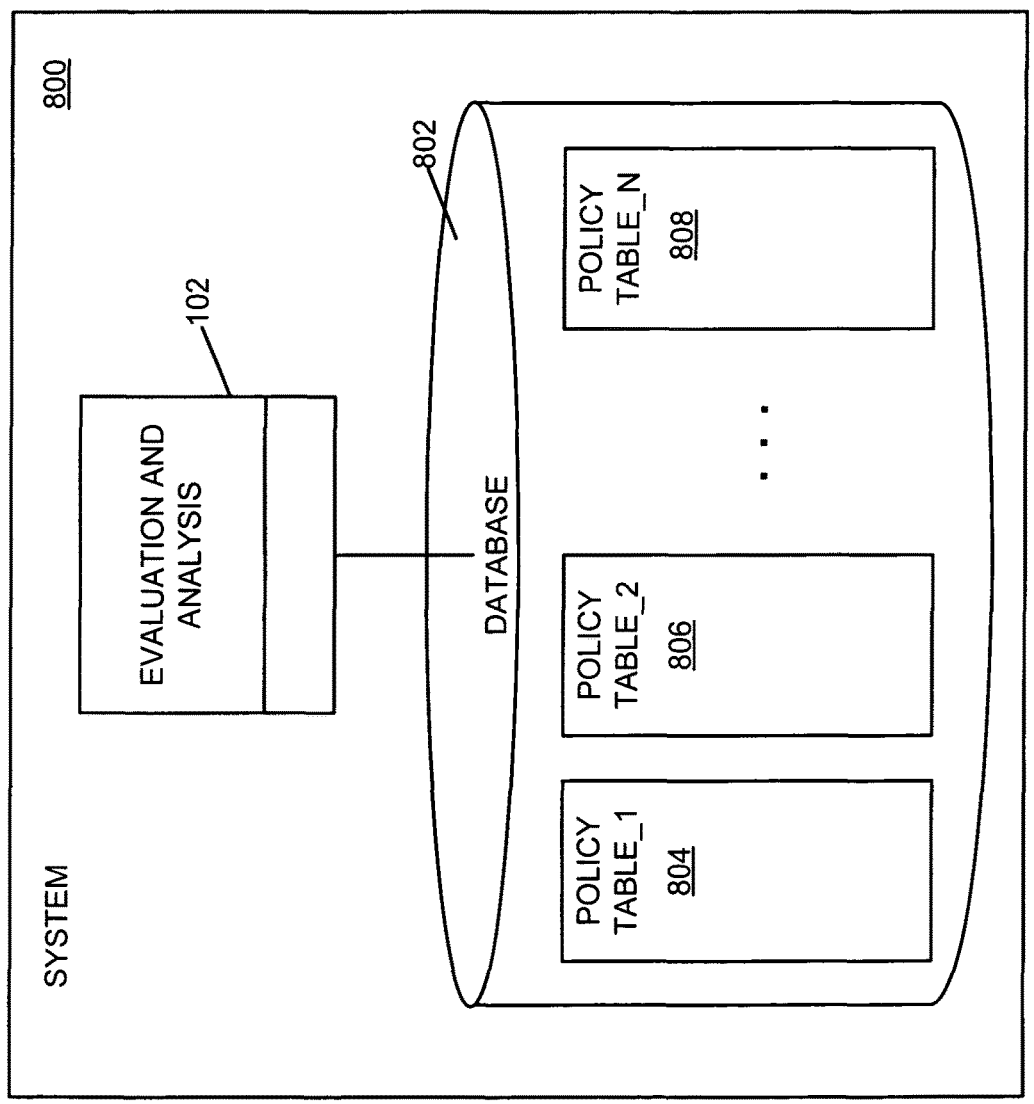
FIG. 8 illustrates a block diagram of an example of a database implementation of an Enterprise Risk Management (ERM) system to support security risk management, security risk control, and security risk profiling for an organization according to an embodiment of the present subject matter.

FIG. 8 illustrates a block diagram of an example of a database implementation of an Enterprise Risk Management (ERM) system 800 to support security risk management, security risk control, and security risk profiling for an organization according to an embodiment of the present subject matter. Within FIG. 8, the evaluation and analysis module 102 is illustrated in association with a database 802. The database 802 may be any type of database, such as a relational or other database. The database 802 includes several policy tables. A policy table_1 804, a policy table_2 806, up to a policy table_N 808 are defined and created within the database 802. The policy tables 804 through 808 provide storage and organizational capabilities for policy instances within the ERM system 800.

As an alternative to storing the raw/severity value of an attribute value directly in its instance database table, the attribute value may be stored in Archimedian form. To determine the value of an attribute "a" in Archimedian form, the inverse of the attribute (e.g., inverseG(a)) is computed for the Archimedian generator "G( )" that is associated with the aggregation operator of attribute "a." For example, the calculated risk attribute 318 may have an aggregation operator defined by the probabilistic sum (e.g., ++), which has an Archimedian generator function G(v)=−ln(1−v). If the calculated value of risk attribute 318 has value "v," then G(v) may be stored as a row in the associated policy table of the database 802. The current value of the risk attribute 318 may then be determined using the inverse function (e.g., inverseG(u)=1−(1/exp(u))). Given a policy table within the database 802 with columns providing risk attribute values, then inverseG may be considered the sum of the risk (e.g., sum(risk)) and provides an efficient calculation of the aggregation of all risk values using the probabilistic sum (e.g., ++).

It should be noted that as an alternative to using a database to implement the hierarchical event model, a compiled or interpretive model, such as a coded object model, may be used to implement the hierarchy of the event management system without departing from the scope of the subject matter described herein. Additionally, any other implementation capable of performing profile information evaluation and analysis is considered within the scope of the subject matter described.

Figure 9:
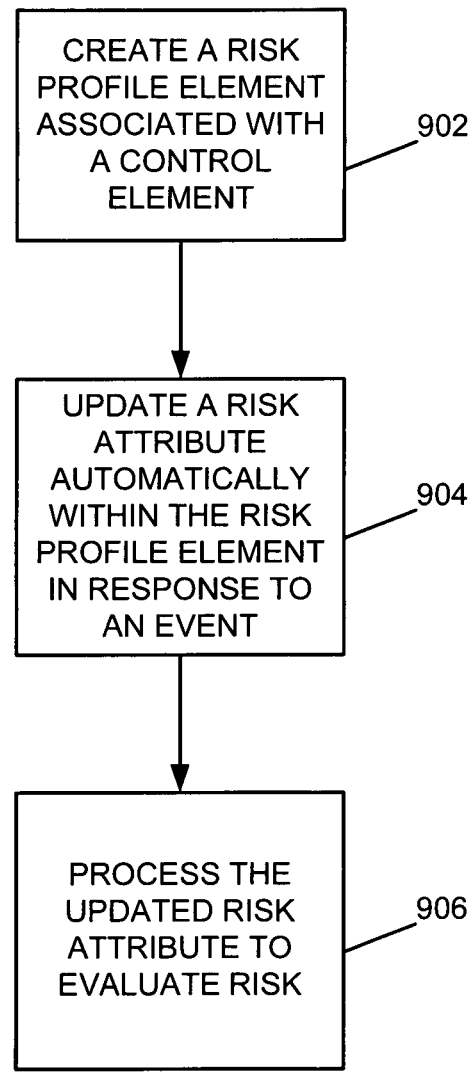
FIG. 9 is a flow chart of an example of an implementation of a process for providing policy evaluation for effectiveness of security risk controls by profiling the effectiveness of the security risk controls within an ERM system according to an embodiment of the present subject matter.

FIG. 9 is a flow chart of an example of an implementation of a process 900 for providing policy evaluation for effectiveness of security risk controls by profiling the effectiveness of the security risk controls within an ERM system, such as the ERM system 100 or the ERM system 800. At block 902, the process 900 creates and associates a risk profile element, such as the risk profile instance 308, with a control element, such as the control instance 304. At block 904, the process 900 automatically updates a risk attribute, such as the risk attribute 318, within the risk profile element in response to an event. The automatic updating of the risk attribute 318 may be performed, for example, by use of the mask(p) instance 312, as described above. At block 906, the process 900 processes the updated risk attribute to evaluate risk. For example, evaluation of the risk may be performed by processing the updated risk attribute 318 via the evaluation and analysis module 102. Additionally, the risk attributed 318 may be processed by normalization via a severity generator function, such as the severity generator function of Equation (6) described above. Further, the risk attributed 318 may be processed by aggregating the risk attributed 318 with other attributes of the same or different type and a roll-up may be performed to propagate information associated with the risk attribute 318 to the evaluation and analysis module 102. Accordingly, the process 900 may be used to implement a variety of activities associated with risk management.

Figure 10:
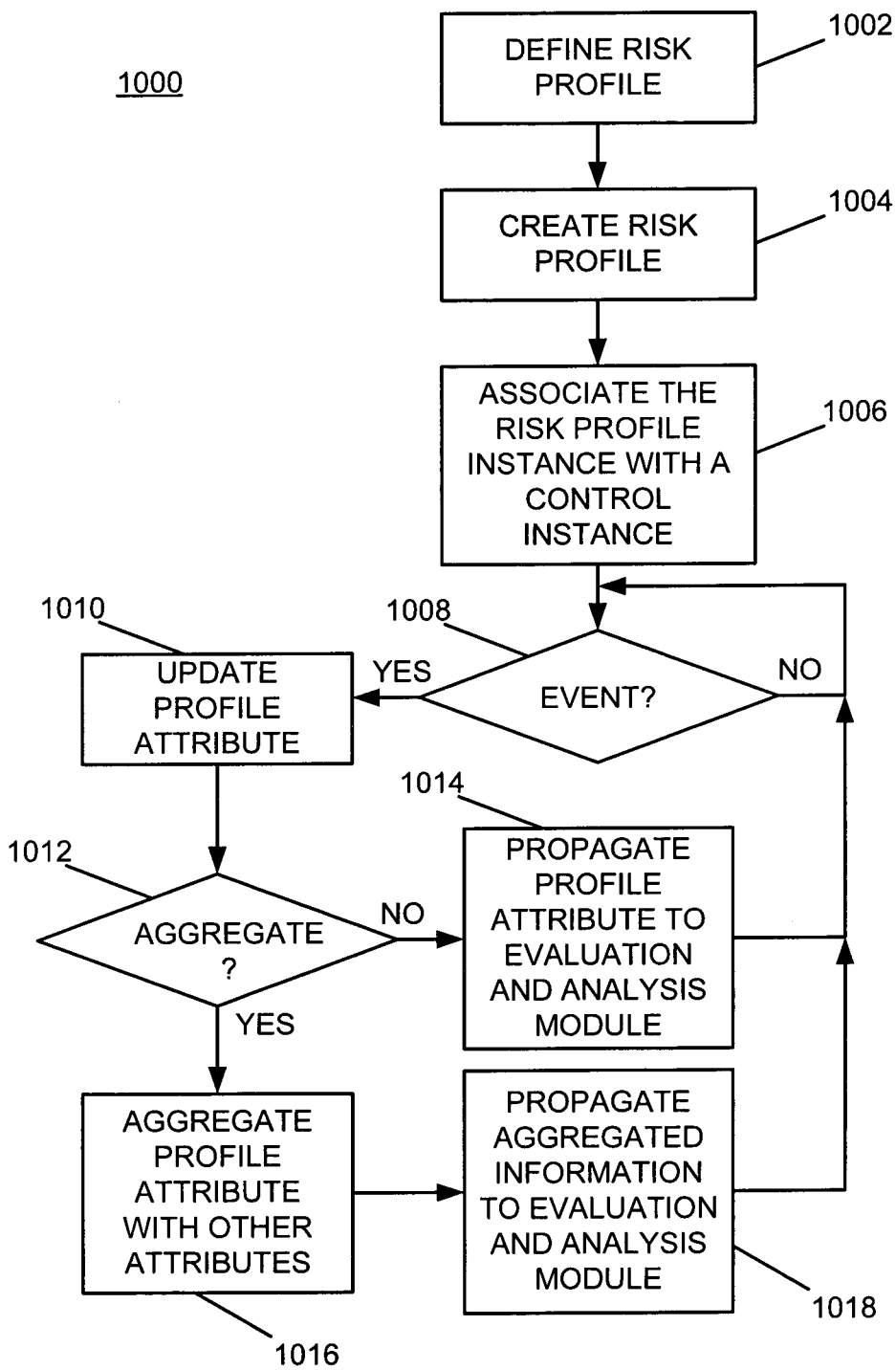
FIG. 10 is a flow chart of an example of an implementation of a process for providing policy evaluation for effectiveness of security risk controls by profiling, aggregating, and propagating information associated with the effectiveness of the security risk controls within an ERM system according to an embodiment of the present subject matter.

FIG. 10 is a flow chart of an example of an implementation of a process 1000 for providing policy evaluation for effectiveness of security risk controls by profiling, aggregating, and propagating information associated with the effectiveness of the security risk controls within an ERM system, such as the ERM system 100 or the ERM system 800. At block 1002, the process 1000 defines a risk profile, such as the risk profile class 216 of FIG. 2. The definition may include attributes, such as the risk attributes 218 of the risk profile class 216. At block 1004, the process 1000 creates a risk profile. Creation of the risk profile may take the form of instantiation of an element or component within a software-based system, but may also include creation of a hardware or other component without deviation from the present subject matter. Furthermore, creation of the risk profile may include designation of a table, such as the policy table_1 804 within the database 802 of FIG. 8.

For purposes of the present example, the creation takes the form of an instantiation of the risk profile class 216 of FIG. 2 into the risk profile instance 308 of FIG. 3 including the risk attribute 318. At block 1006, the process 1000 associates the risk profile instance 308 with a control instance, such as the control instance 304 of FIG. 3.

At decision point 1008, the process 1000 waits for an event to trigger updating of a profile attribute. The event may be an event that occurs asynchronously or may be a scheduled or periodic event. The profile attribute may be any defined profile attribute. For example, the profile attribute may be the risk attribute 318 of the risk instance 308 and the event may be execution of the test instance 310. Alternatively, the profile attribute may be the authentication risk attribute 324 of the authentication instance 320 or the separation risk attribute 330 of the separation of duty instance 326. It is understood that these example instances and attributes are describe for illustrative purposes only and do not in any way limit the scope of the present subject matter.

The triggering event may be any event associated with a control instance, such as the control instance 304 described above. Upon occurrence of an event associated with the control instance 304, the process 1000 updates the associated profile attribute at block 1010. The updating of the profile attribute may be performed in any appropriate manner. For example, if the profile attribute to be updated is the risk attribute 318, the updating of the profile attribute may be performed via execution of the mask(p) instance 312 to update the risk attribute 318 in response to execution of the test instance 310, as described above. Additionally, the profile attribute may be normalized probabilistically using a severity generator function, such as the severity generator function of Equation (6).

It should be understood that the ERM system 100 and ERM system 800 allow access to individual attributes in addition to aggregation and roll-up of attributes. Accordingly, the process 1000 makes a determination whether to aggregate the profile attribute with other attributes at decision point 1012. If a determination is made not to aggregate the profile attribute with other attributes at decision point 1012, the process 1000 propagates the profile attribute to an evaluation and analysis module, such as the evaluation and analysis module 102, at block 1014.

It should be understood that propagation of the profile attribute to the evaluation and analysis module 102 may include either direct access of the profile attribute by the evaluation and analysis module 102 or forwarding the of profile attribute as part of a message to the evaluation and analysis module 102. However, it is also understood that propagation of the profile attribute to the evaluation and analysis module 102 may also include a roll-up activity as described above or any other activity designed to propagate information associated with the profile attribute into a usable format for evaluation and analysis. The propagation may be performed either in real time or in response to a scheduled or non-scheduled inquiry, such as a database query operation for the database 802.

If a determination is made to aggregate the profile attribute with other attributes at decision point 1012, the process 1000 aggregates the profile attribute with other attributes at block 1016. The aggregation at block 1016 may be performed for attributes of a selected type and may further include normalization activities for different types of attributes, as described above. Upon completion of the aggregation activities of block 1016, the process 1000 propagates the aggregated information to an evaluation and analysis module, such as the evaluation and analysis module 102, at block 1018.

As described above in association with propagation of the profile attribute to the evaluation and analysis module 102 at block 1014, propagation of aggregated information may take any form suitable to propagate the aggregated information to the evaluation and analysis module 102 in a usable format for evaluation and analysis. For example, propagation of the aggregated information to the evaluation and analysis module 102 may include either direct access of the aggregated information by the evaluation and analysis module 102 or forwarding the of aggregated information as part of a message to the evaluation and analysis module 102. However, it is also understood that propagation of the aggregated information to the evaluation and analysis module 102 may also include a roll-up activity as described above or any other activity designed to propagate information associated with profile attributes into a usable format for evaluation and analysis. The propagation may be performed either in real time or in response to a scheduled or non-scheduled inquiry, such as a database query operation for the database 802.

Upon completion of the propagation activities of block 1014 or 1018, the process 1000 returns to await a new event at decision point 1008. Accordingly, the process 1000 provides for profile attribute updating in response to events within a system, such as the ERM system 100 or the ERM system 800. The process 1000 further provides for aggregation and propagation of profile information to an evaluation and analysis module, such as the evaluation and analysis module 102.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Those skilled in the art will recognize improvements and modifications to the preferred embodiments of the present invention. All such improvements and modifications are considered within the scope of the concepts disclosed herein and the claims that follow.

What is claimed is:
1. A method comprising:
 by an enterprise risk management (ERM) processor(s) set:
  instantiating, within a memory from a risk profile class definition, at least one risk profile instance that compartmentalizes real-time authentication services security risk metrics and real-time user access compliance risk metrics associated with operational real-time authentication services security risk mitigation and real-time user access compliance risk mitigation performed by at least one control instance, where the at least one control instance is instantiated from a control class definition within a policy instance instantiated from a policy hierarchy class definition, where the policy hierarchy class definition associates as subclasses the control class definition and the risk profile class definition that each define accessible attributes that store real-time data values and define executable code segments that may be invoked within the respective instantiated at least one control instance and the instantiated at least one risk profile instance;

updating, by invocation of an object public-interface executable code segment of the at least one risk profile instance, a real-time data value of a risk attribute automatically within the at least one risk profile instance in response to a real-time event associated with the at least one control instance, where the risk attribute represents one or more of the real-time authentication services security risk mitigation and the real-time user access compliance risk mitigation performed by the at least one control instance;

performing real-time control of policy enforcement actions within an ERM system related to network security, where control of policy enforcement actions comprises regulating user operations within a network according to a defined security policy, and where real-time specifies a time frame of sufficiently short duration to perform computational policy decisions contemporaneously with detection of the regulated user operations;

performing, simultaneously within the time frame of performing the real-time control of policy enforcement actions, real-time self-diagnosis of functional code improvements for the ERM system;

where performing the real-time self-diagnosis of the functional code improvements for the ERM system comprises using results of the real-time control of policy enforcement actions to identify network security vulnerabilities capable of being mitigated with code modifications to the control class definition, and further comprises:

determining real-time execution effectiveness of the at least one control instance at operationally mitigating the respective real-time authentication services security risk(s) and the user access compliance risk(s) represented within the updated real-time data value of the risk attribute; and identifying, using real-time class design feedback from the at least one risk profile instance within the ERM system and the determined real-time execution effectiveness of the at least one control instance, at least one code modification to the control class definition that adjusts one or more real-time operational control aspects of the at least one control instance and improves real-time execution effectiveness and operational capabilities of a new control instance instantiated from an updated control class definition at operationally mitigating the respective real-time authentication services security risk(s) and user access compliance risk(s) within the ERM system; and the method further comprising performing an automated execution of a test procedure against the new control instance instantiated from the updated control class definition, with a successful test result confirming a functional improvement to the real-time execution effectiveness and operational capabilities of the new control instance.

2. The method of claim 1, where:
updating the real-time data value of the risk attribute comprises:
normalizing the risk attribute using hysteresis that applies dynamic attack rate variations and dynamic decay rate variations regarding severity of real-time events to the risk attribute, where the severity of the real-time events comprises (i) a probabilistic measure of significance of the updated real-time data value of the risk attribute and (ii) an indication of real-time criticality of the at least one code modification to the control class definition that adjusts the one or more real-time operational control aspects of the at least one control instance.

3. The method of claim 2, where determining the real-time execution effectiveness of the at least one control instance at operationally mitigating the respective real-time authentication services security risk(s) and the user access compliance risk(s) represented within the updated real-time data value of the risk attribute comprises determining whether the real-time data value of the risk attribute has crossed a severity threshold associated with the probabilistic measure indicative of (i) a real-time risk condition associated with the at least one control instance and (ii) severe real-time criticality of the at least one code modification to the control class definition that adjusts the one or more real-time operational control aspects of the at least one control instance.

4. The method of claim 1, where determining the real-time execution effectiveness of the at least one control instance at operationally mitigating the respective real-time authentication services security risk(s) and the user access compliance risk(s) represented within the updated real-time data value of the risk attribute comprises processing the updated real-time data value of the risk attribute in real time and providing a real-time assessment of risk associated with the control class definition used to instantiate the at least one control instance.

5. The method of claim 1, where determining the real-time execution effectiveness of the at least one control instance at operationally mitigating the respective real-time authentication services security risk(s) and the user access compliance risk(s) represented within the updated real-time data value of the risk attribute comprises aggregating the updated real-time data value of the risk attribute with a value of at least one other attribute.

6. The method of claim 5, where a data type associated with the at least one other attribute differs from a data type associated with the updated real-time data value of the risk attribute and where aggregating the updated real-time data value of the risk attribute with the value of the at least one other attribute comprises normalizing the updated real-time data value of the risk attribute for aggregation with the value of the at least one other attribute.

7. The method of claim 1, where determining the real-time execution effectiveness of the at least one control instance at operationally mitigating the respective real-time authentication services security risk(s) and the user access compliance risk(s) represented within the updated real-time data value of the risk attribute comprises:

propagating the real-time data value of the risk attribute within a hierarchy of the policy instance; and performing an assessment of the risk attribute from a level within the hierarchy of the policy instance higher than a level within the hierarchy of the policy instance at which the risk profile instance is associated.

8. The method of claim 1, where the risk profile class definition further defines an executable code segment capable of providing information regarding how to modify code within at least one of the risk profile class definition and the control class definition to improve quality of generated information associated with tracked real-time event activities, and where the at least one risk profile instance further performs real-time event tracking and monitoring of real-time events associated with the at least one control instance.

9. A system comprising:
a memory that stores a policy hierarchy class definition that associates as subclasses a control class definition and a risk profile class definition that each define accessible attributes that store real-time data values and define executable code segments that may be invoked within control instances and risk profile instances respectively instantiated from the control class definition and the risk profile class definition; and
an enterprise risk management (ERM) processor(s) set programmed to:
instantiate:
a control instance from the control class definition in the memory executable to mitigate operational real-time authentication services security risk and real-time user access compliance risk within a policy instance instantiated from the policy hierarchy class definition;
a risk profile instance, from the risk profile class definition in the memory, that compartmentalizes real-time authentication services security risk metrics and real-time user access compliance risk metrics associated with the operational real-time authentication services security risk mitigation and the real-time user access compliance risk mitigation performed by the control instance, where the risk profile instance is executable to monitor real-time effectiveness of the control instance at mitigating the operational real-time authentication services security risk and the real-time user access compliance risk within the policy instance; and
a mask instance in the memory executable to update, by invocation of an object public-interface executable code segment of the risk profile instance, a real-time data value of a risk attribute automatically within the risk profile instance in response to a real-time event associated with the control instance, where the risk attribute represents one or more of the real-time authentication services security risk mitigation and the real-time user access compliance risk mitigation performed by the control instance; and
execute:
an evaluation and analysis module configured to:
perform real-time control of policy enforcement actions within an ERM system related to network security, where control of policy enforcement actions comprises regulating user operations within a network according to a defined security policy, and where real-time specifies a time frame of sufficiently short duration to perform computational policy decisions contemporaneously with detection of the regulated user operations;
perform, simultaneously within the time frame of performing the real-time control of policy enforcement actions, real-time self-diagnosis of functional code improvements for the ERM system;
where in being configured to perform the real-time self-diagnosis of the functional code improvements for the ERM system, the evaluation and analysis module is configured to use results of the real-time control of policy enforcement actions to identify network security vulnerabilities capable of being mitigated with code modifications to the control class definition, and further comprises being configured to:
determine the real-time execution effectiveness of the control instance at operationally mitigating the respective real-time authentication services security risk(s) and the user access compliance risk(s) represented within the updated real-time data value of the risk attribute; and
identify, using real-time class design feedback from the risk profile instance within the ERM system and the determined real-time execution effectiveness of the control instance, at least one code modification to the control class definition that adjusts one or more real-time operational control aspects of the control instance and improves real-time execution effectiveness and operational capabilities of a new control instance instantiated from an updated control class definition at operationally mitigating the respective real-time authentication services security risk(s) and user access compliance risk(s) within the ERM system; and
where the evaluation and analysis module is further configured to perform an automated execution of a test procedure against the new control instance instantiated from the updated control class definition, with a successful test result confirming a functional improvement to the real-time execution effectiveness and operational capabilities of the new control instance.

10. The system of claim 9, where:
in being executable to update the real-time data value of the risk attribute automatically, the mask instance is executable to:
normalize the risk attribute using hysteresis that applies dynamic attack rate variations and dynamic decay rate variations regarding severity of real-time events to the risk attribute, where the severity of the real-time events comprises (i) a probabilistic measure of significance of the updated real-time data value of the risk attribute and (ii) an indication of real-time criticality of the at least one code modification to the control class definition that adjusts the one or more real-time operational control aspects of the control instance.

11. The system of claim 10, where, in being configured to determine the real-time execution effectiveness of the control instance at operationally mitigating the respective real-time authentication services security risk(s) and the user access compliance risk(s) represented within the updated real-time data value of the risk attribute, the evaluation and analysis module is configured to determine whether the real-time data value of the risk attribute has crossed a severity threshold associated with the probabilistic measure indicative of (i) a real-time risk condition associated with the control instance and (ii) severe real-time criticality of the at least one code modification to the control class definition that adjusts the one or more real-time operational control aspects of the control instance.

12. The system of claim 9, where, in being configured to determine the real-time execution effectiveness of the control instance at operationally mitigating the respective real-time authentication services security risk(s) and the user access compliance risk(s) represented within the updated real-time data value of the risk attribute, the evaluation and analysis module is configured to process the updated real-time data value of the risk attribute in real time and to provide a real-time assessment of risk associated with the control class definition used to instantiate the control instance.

13. The system of claim 9, where, in being configured to determine the real-time execution effectiveness of the control instance at operationally mitigating the respective real-time authentication services security risk(s) and the user access compliance risk(s) represented within the updated real-time data value of the risk attribute, the evaluation and analysis module is configured to aggregate the updated real-time data value of the risk attribute with a value of at least one other attribute.

14. The system of claim 13, where a data type associated with the at least one other attribute differs from a data type associated with the updated real-time data value of the risk attribute, and where in being configured to aggregate the updated real-time data value of the risk attribute with the value of the at least one other attribute, the evaluation and analysis module is configured to normalize the updated real-time data value of the risk attribute for aggregation with the value of the at least one other attribute.

15. The system of claim 9, where, in being configured to determine the real-time execution effectiveness of the control instance at operationally mitigating the respective real-time authentication services security risk(s) and the user access compliance risk(s) represented within the updated real-time data value of the risk attribute, the evaluation and analysis module is configured to:
propagate the real-time data value of the risk attribute within a hierarchy of the policy instance; and
perform an assessment of the risk attribute from a level within a hierarchy of the policy instance higher than a level within the hierarchy of the policy instance at which the risk profile instance is associated.

16. The system of claim 9, where the risk profile class definition further defines an executable code segment capable of providing information regarding how to modify code within at least one of the risk profile class definition and the control class definition to improve quality of generated information associated with tracked real-time event activities, and where the processor is further programmed to execute the risk profile instance to perform real-time event tracking and monitoring of real-time events associated with the control instance.

17. A computer program product comprising a computer useable storage device including a computer readable program, where the computer readable program when executed on a computer of an enterprise risk management (ERM) system causes the computer to:
instantiate, within a memory from a risk profile class definition, at least one risk profile instance that compartmentalizes real-time authentication services security risk metrics and real-time user access compliance risk metrics associated with operational real-time authentication services security risk mitigation and real-time user access compliance risk mitigation performed by at least one control instance, where the at least one control instance is instantiated from a control class definition within a policy instance instantiated from a policy hierarchy class definition, where the policy hierarchy class definition associates as subclasses the control class definition and the risk profile class definition that each define accessible attributes that store real-time data values and define executable code segments that may be invoked within the respective instantiated at least one control instance and the instantiated at least one risk profile instance;
update, by invocation of an object public-interface executable code segment of the at least one risk profile instance, a real-time data value of a risk attribute automatically within the at least one risk profile instance in response to a real-time event associated with the at least one control instance, where the risk attribute represents one or more of the real-time authentication services security risk mitigation and the real-time user access compliance risk mitigation performed by the at least one control instance;
perform real-time control of policy enforcement actions within an ERM system related to network security, where control of policy enforcement actions comprises regulating user operations within a network according to a defined security policy, and where real-time specifies a time frame of sufficiently short duration to perform computational policy decisions contemporaneously with detection of the regulated user operations;
perform, simultaneously within the time frame of performing the real-time control of policy enforcement actions, real-time self-diagnosis of functional code improvements for the ERM system;
where, in causing the computer to perform the real-time self-diagnosis of the functional code improvements for the ERM system, the computer readable program when executed on the computer causes the computer to use results of the real-time control of policy enforcement actions to identify network security vulnerabilities capable of being mitigated with code modifications to the control class definition, and further causes the computer to:
determine real-time execution effectiveness of the at least one control instance at operationally mitigating the respective real-time authentication services security risk(s) and the user access compliance risk(s) represented within the updated real-time data value of the risk attribute; and
identify, using real-time class design feedback from the at least one risk profile instance within the ERM system and the determined real-time execution effectiveness of the at least one control instance, at least one code modification to the control class definition that adjusts one or more real-time operational control aspects of the at least one control instance and improves real-time execution effectiveness and operational capabilities of a new control instance instantiated from an updated control class definition at operationally mitigating the respective real-time authentication services security risk(s) and user access compliance risk(s) within the ERM system; and where computer readable program when executed on the computer further causes the computer to perform an automated execution of a test procedure against the new control instance instantiated from the updated control class definition, with a successful test result confirming a functional improvement to the real-time execution effectiveness and operational capabilities of the new control instance.

18. The computer program product of claim 17, where:
in causing the computer to update the real-time data value of the risk attribute, the computer readable program when executed on the computer causes the computer to:
normalize the risk attribute using hysteresis that applies dynamic attack rate variations and dynamic decay rate variations regarding severity of real-time events to the risk attribute, where the severity of the real-time events comprises (i) a probabilistic measure of significance of the updated real-time data value of the risk attribute and (ii) an indication of real-time criticality of the at least one code modification to the control class definition that adjusts the one or more real-time operational control aspects of the at least one control instance.

19. The computer program product of claim 18, where, in causing the computer to determine the real-time execution effectiveness of the at least one control instance at operationally mitigating the respective real-time authentication services security risk(s) and the user access compliance risk(s) represented within the updated real-time data value of the risk attribute, the computer readable program when executed on the computer causes the computer to determine whether the real-time data value of the risk attribute has crossed a severity threshold associated with the probabilistic measure indicative of (i) a real-time risk condition associated with the at least one control instance and (ii) severe real-time criticality of the at least one code modification to the control class definition that adjusts the one or more real-time operational control aspects of the at least one control instance.

20. The computer program product of claim 17, where, in causing the computer to determine the real-time execution effectiveness of the at least one control instance at operationally mitigating the respective real-time authentication services security risk(s) and the user access compliance risk(s) represented within the updated real-time data value of the risk attribute, the computer readable program when executed on the computer causes the computer to aggregate the updated real-time data value of the risk attribute with a value of at least one other attribute.

21. The computer program product of claim 20, where a data type associated with the at least one other attribute differs from a data type associated with the updated real-time data value of the risk attribute, and where in causing the computer to aggregate the updated real-time data value of the risk attribute with the value of the at least one other attribute, the computer readable program when executed on the computer causes the computer to normalize the updated real-time data value of the risk attribute for aggregation with the value of the at least one other attribute.

22. The computer program product of claim 17, where, in causing the computer to determine the real-time execution effectiveness of the at least one control instance at operationally mitigating the respective real-time authentication services security risk(s) and the user access compliance risk(s) represented within the updated real-time data value of the risk attribute, the computer readable program when executed on the computer causes the computer to:
propagate the real-time data value of the risk attribute within a hierarchy of the policy instance; and
perform an assessment of the risk attribute from a level within the hierarchy of the policy instance higher than a level within the hierarchy of the policy instance at which the risk profile instance is associated.

23. The computer program product of claim 17, where the risk profile class definition further defines an executable code segment capable of providing information regarding how to modify code within at least one of the risk profile class definition and the control class definition to improve quality of generated information associated with tracked real-time event activities, and where the computer readable program when executed on the computer further causes the computer to execute the at least one risk profile instance to perform real-time event tracking and monitoring of real-time events associated with the at least one control instance.

* * * * *